(12) United States Patent
Hearn et al.

(10) Patent No.: US 9,550,248 B2
(45) Date of Patent: Jan. 24, 2017

(54) ELECTRIC ARC WELDER USING HIGH FREQUENCY PULSES AND NEGATIVE POLARITY

(71) Applicant: Lincoln Global, Inc., City of Industry, CA (US)

(72) Inventors: James E. Hearn, Brunswick, OH (US); Steven R. Peters, Huntsburg, OH (US)

(73) Assignee: Lincoln Global, Inc., City of Industry, CA (US)

( * ) Notice: Subject to any disclaimer, the term of this patent is extended or adjusted under 35 U.S.C. 154(b) by 408 days.

(21) Appl. No.: 13/788,486

(22) Filed: Mar. 7, 2013

(65) Prior Publication Data

US 2014/0251971 A1    Sep. 11, 2014

(51) Int. Cl.
| | | |
|---|---|---|
| B23K 9/09 | (2006.01) | |
| B23K 9/12 | (2006.01) | |
| B23K 9/10 | (2006.01) | |
| B23K 9/173 | (2006.01) | |

(52) U.S. Cl.
CPC .............. *B23K 9/092* (2013.01); *B23K 9/093* (2013.01); *B23K 9/1043* (2013.01); *B23K 9/125* (2013.01); *B23K 9/173* (2013.01); *B23K 2203/10* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,085,402 A | * | 6/1937 | Vance ........................... | 327/139 |
| 3,598,954 A | * | 8/1971 | Iceland et al. ................ | 219/111 |
| 3,679,866 A | * | 7/1972 | Arikawa et al. .......... | 219/137 R |
| 3,781,511 A | * | 12/1973 | Rygiol ...................... | 219/137 R |
| 4,019,018 A | * | 4/1977 | Oishi et al. ............... | 219/137 R |
| 4,861,965 A | * | 8/1989 | Stava ........................ | 219/130.51 |
| 4,994,646 A | | 2/1991 | Tabata et al. | |
| 5,073,695 A | * | 12/1991 | Gilliland .................. | 219/130.31 |

(Continued)

FOREIGN PATENT DOCUMENTS

| | | |
|---|---|---|
| EP | 890407 | 1/1999 |
| EP | 1439021 | 7/2004 |

(Continued)

OTHER PUBLICATIONS

International Search Report and Written Opinion from PCT/IB2014/000251 dated Aug. 12, 2014.

*Primary Examiner* — Dana Ross
*Assistant Examiner* — Renee Larose
(74) *Attorney, Agent, or Firm* — Calfee, Halter & Griswold LLP

(57) ABSTRACT

An electric arc welder including a high speed switching power supply with a controller for creating high frequency current pulses with negative polarity components through the gap between a workpiece and a welding wire advancing toward the workpiece, where the pulses and a background current defining a series of weld cycles. A wave shape generator defines the shape of the pulses and the background current including a controlled ramp up and/or ramp down in each of said cycles, and a circuit to change the shapes of the pulses and/or background current in a repeating pattern in each of the weld cycles, including a negative current in at one of said pulses. The shape change in a cycle can be between first and second shapes or by a rhythmic AC modulation.

22 Claims, 23 Drawing Sheets

(56) References Cited

U.S. PATENT DOCUMENTS

| | | | |
|---|---|---|---|
| 5,138,132 A * | 8/1992 | Baurle et al. | 219/137 PS |
| 5,643,479 A | 7/1997 | Lloyd et al. | |
| 5,667,709 A | 9/1997 | Ueyama et al. | |
| 6,225,598 B1 * | 5/2001 | Nihei et al. | 219/137 PS |
| 6,346,684 B1 * | 2/2002 | Gabbianelli et al. | 219/117.1 |
| 6,515,259 B1 * | 2/2003 | Hsu | B23K 9/092 219/130.31 |
| 6,621,037 B2 * | 9/2003 | Gabbianelli et al. | 219/94 |
| 6,683,278 B2 | 1/2004 | Stava et al. | |
| 6,689,982 B2 * | 2/2004 | Gabbianelli et al. | 219/118 |
| 6,713,707 B2 * | 3/2004 | Gabbianelli et al. | 219/94 |
| 6,870,132 B2 * | 3/2005 | Stava | B23K 9/1075 219/130.51 |
| 7,053,334 B2 * | 5/2006 | Stava | B23K 9/092 219/130.51 |
| 7,166,818 B2 | 1/2007 | Stava et al. | |
| 7,271,365 B2 * | 9/2007 | Stava et al. | 219/130.51 |
| 7,705,270 B2 | 4/2010 | Norrish et al. | |
| 8,080,763 B2 | 12/2011 | Fujiwara et al. | |
| 8,124,913 B2 * | 2/2012 | Artelsmair | B23K 9/092 219/130.21 |
| 2007/0210048 A1 * | 9/2007 | Koshiishi et al. | 219/130.51 |
| 2007/0267393 A1 | 11/2007 | Dodge et al. | |
| 2012/0097655 A1 | 4/2012 | Daniel et al. | |

FOREIGN PATENT DOCUMENTS

| | | |
|---|---|---|
| EP | 1782907 | 5/2007 |
| JP | 58-176074 | 10/1983 |

\* cited by examiner

| WORKPOINT | RAMP UP TIME | PEAK TIME | PEAK AMP | RAMP DOWN TIME | NEG. TIME | NEG. AMP | BACK-GROUND TIME | BACK-GROUND AMP | WFS |
|---|---|---|---|---|---|---|---|---|---|
| 100 | 1.4 | 0.6 | 400 | 2.5 | 1 | -30 | 9 | 30 | 100 |
| 200 | 1.3 | 0.6 | 405 | 2.3 | 0.5 | -15 | 4 | 70 | 200 |
| 300 | 1.2 | 0.6 | 410 | 2 | 0 | - | 3 | 100 | 300 |
| 400 | 1.1 | 0.7 | 420 | 1.5 | 0 | - | 2 | 125 | 400 |
| 500 | 1 | 0.7 | 460 | 1 | 0 | - | 1 | 150 | 500 | ue
ELECTRIC ARC WELDER USING HIGH FREQUENCY PULSES AND NEGATIVE POLARITY

INCORPORATION BY REFERENCE

The following patents include background information related to the subject matter of the current application and are also incorporated by reference herein in full: U.S. Pat. No. 4,994,646, U.S. Pat. No. 5,643,479, U.S. Pat. No. 5,667,709, U.S. Pat. No. 6,515,259, U.S. Pat. No. 6,683,278, U.S. Pat. No. 7,166,818, and Japanese Pat. No. 58-176074.

The present invention relates to the art of electric arc welding using a gas metal arc welding (GMAW) process and more particularly to a GMAW electric arc welder that creates a high frequency chain of current pulses to form a series of weld cycles constituting a weld process.

BACKGROUND OF THE INVENTION

Pulsed AC or variable polarity gas tungsten arc welding (GTAW) may be used to weld aluminum when appearance is important. The modulation of current in the process serves to alternately expand and cool the puddle, thus creating a series of ridges in the weld bead, sometimes called a "stacked dimes" appearance. To speed up the process, beyond the speed of a GTAW process, GMAW has often been used, but with difficulty in achieving a "stacked dime" weld appearance. To achieve a similar "stacked dime" weld appearance via GMAW welding instead of GTAW welding, the operator can shuffle the torch, forward/backward in the joint. While shuffling can result in a desirable stacked dime appearance, it requires the operator to manipulate the torch rapidly, resulting in a process that is not as fast as a straight progression and that produces inconsistent results. Another approach to achieve the "stacked dime" appearance with GMAW is the modulation of a pulsed waveform's parameters to achieve high energy and low energy portions of the weld cycle. The high energy portion delivers high heat to the weld puddle/pool, whereas the low energy portion delivers relatively low heat to the weld puddle. A high energy portion of a weld cycle can expand the weld puddle size, whereas a low energy portion of a weld cycle can allow the puddle to cool and shrink, creating the ridges associated with the "stacked dime" appearance. Although the method works, in order to achieve the desired bead appearance, significant differences in pulse parameters are required, often resulting in spattering in the high energy segment and stubbing in the low energy segment. Still another approach is to synergistically modulate the wire feed speed to modulate the heat and achieve the desired "stacked dime" appearance. Modulation of the wire feed speed (with associated pulse parameters) may be effective and may achieve the desired bead shape, but requires a slowdown in travel speed because the resulting deposit rate is significantly slowed by the low energy portion. Thus, there is a need for a process that delivers an attractive "stacked dime" bead shape appearance and is achieved at a speed similar to the steady state GMAW process.

SUMMARY OF INVENTION

An electric arc welder including a high speed switching power supply with a controller for creating high frequency current pulses through a gap between a workpiece and a welding wire advancing toward the workpiece, a wave shape generator to define a shape of the high frequency current pulses and a polarity of the high frequency current pulses, and wherein at least one of the high frequency current pulses includes negative polarity current.

The descriptions of the invention do not limit the words used in the claims in any way or the scope of the claims or invention. The words used in the claims have all of their full ordinary meanings

BRIEF DESCRIPTION OF THE DRAWINGS

In the accompanying drawings, which are incorporated in and constitute a part of the specification, embodiments of the invention are illustrated, which, together with a general description of the invention given above, and the detailed description given below, serve to exemplify embodiments of this invention.

DETAILED DESCRIPTION

Figure 1:
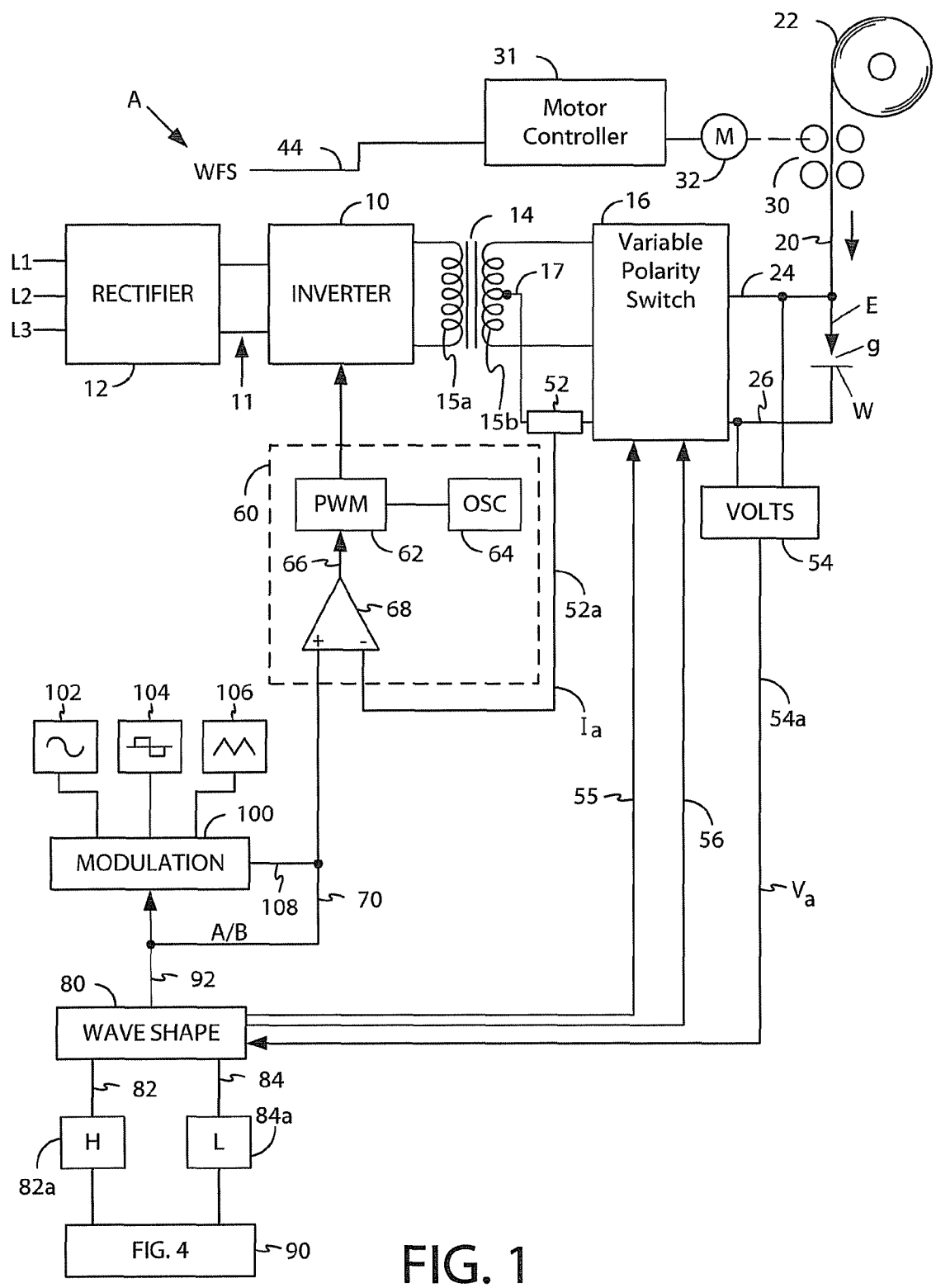
FIG. 1 is an exemplary combined block diagram and system architecture for performing an embodiment of the present invention.
Figure 1A:
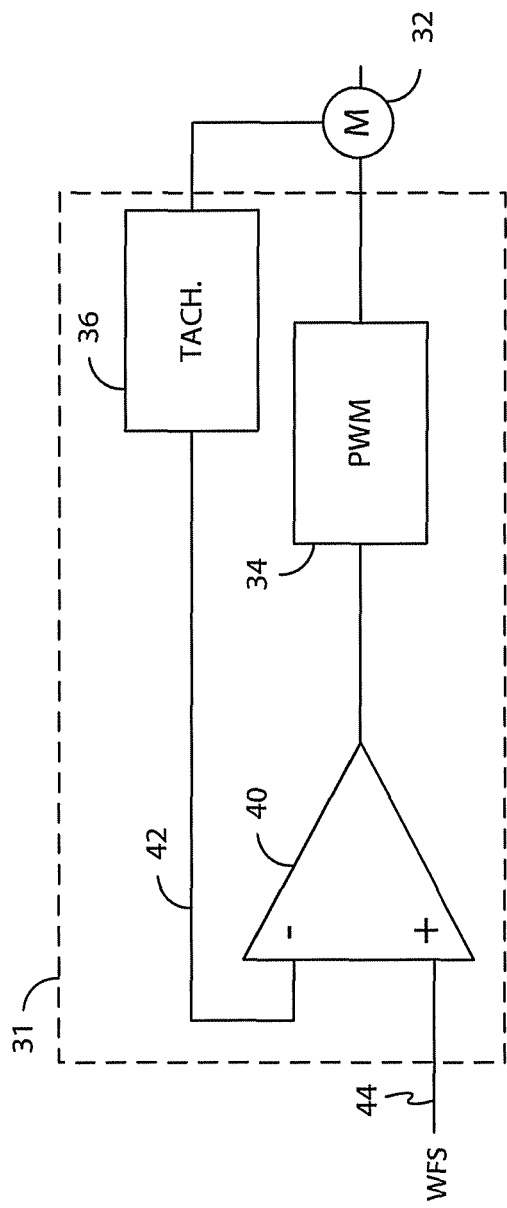
FIG. 1A is a circuit diagram of an exemplary motor controller in an embodiment of the present invention.

Referring now to the drawings, which are for the purpose of illustrating exemplary embodiments of the invention only and not for the purpose of limiting same, FIG. 1 discloses an exemplary welder A having a generally standard configuration, including a high speed switching power supply 10, such as an inverter or buck converter, with an input rectifier 12 and an output transformer 14 directing current pulses by way of a variable polarity switch 16 to an electrode E. Various exemplary variable polarity switches 16 are described in FIGS. 2A-2C below. The electrode E includes an aluminum wire 20 from a spool or drum 22 and advanced by feeder 30 toward workpiece W through the action of motor 32. Motor 32 is controlled with a motor controller 31. An exemplary motor controller is shown in FIG. 1A, where a pulse width modulator 34 controls the speed of motor 32 and thus feeder 30 under direction of a feed back tachometer 36 and an operational amplifier 40 for comparing input 42 from tachometer 36 with a command wire feed speed (WFS) signal in the form of a level on line 44. Other motor controllers 31 may also be used. Referring back to FIG. 1, as the aluminum electrode or wire E advances toward workpiece W, an arc is created across gap g by a series of current pulses combined with a background current.

Referring now to the exemplary power supply, the inverter stage includes a switching type inverter 10 provided with power from three phase voltage source L1-L3 having a frequency of 50 or 60 Hz according to the local line frequency. The AC input voltage is rectified by rectifier 12 to provide a DC link 11 directed to the input of inverter 10. The output, or load of inverter 10 is transformer 14 having a primary winding 15a and secondary winding 15b with a grounded center tap 17. Secondary winding 15b is directed to the variable polarity switch 16 to create output lines 24, 26 connected to electrode E and workpiece W.

Figure 2A:
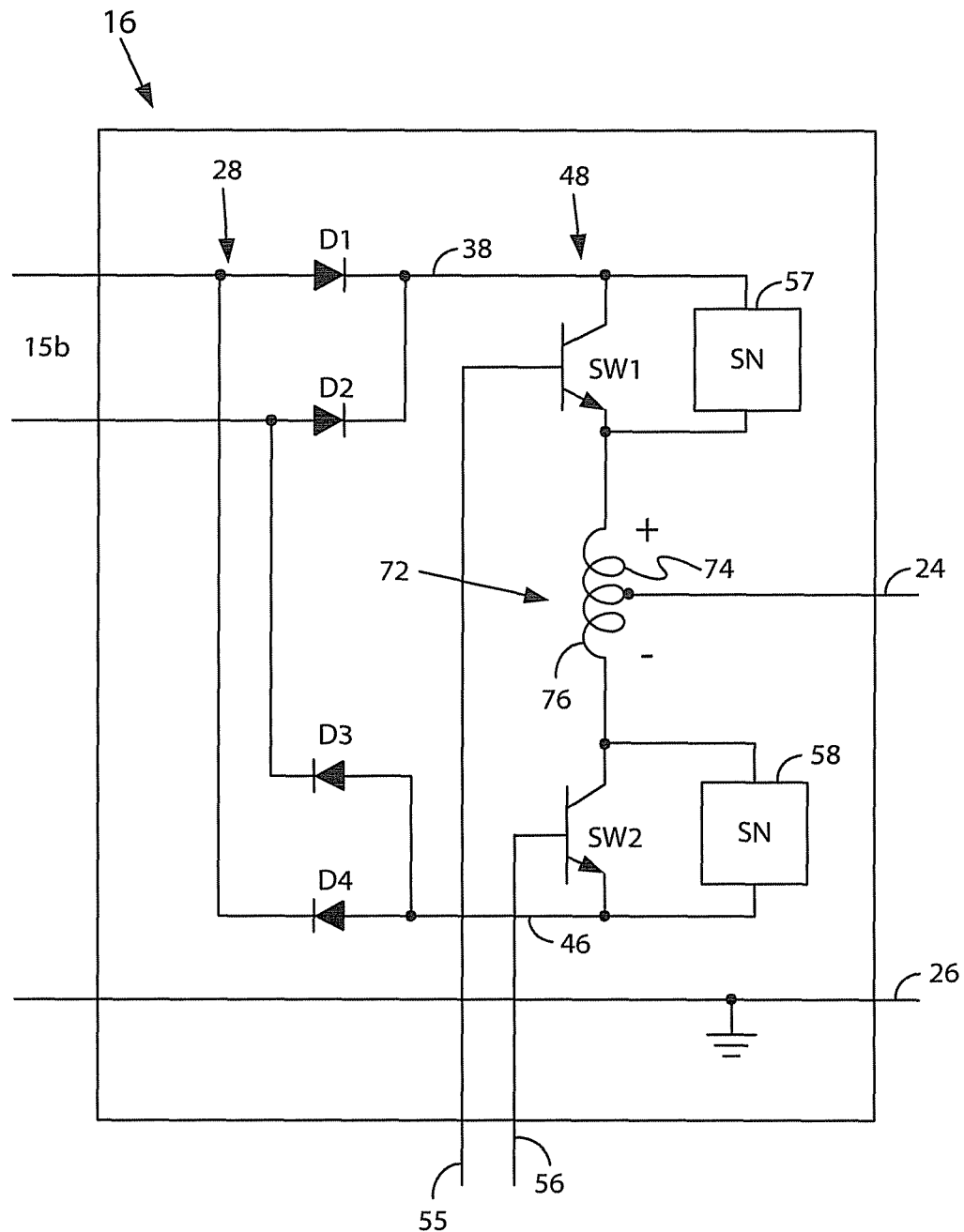
FIG. 2A is a circuit diagram of an exemplary variable polarity switch in an embodiment of the present invention.
Figure 2B:
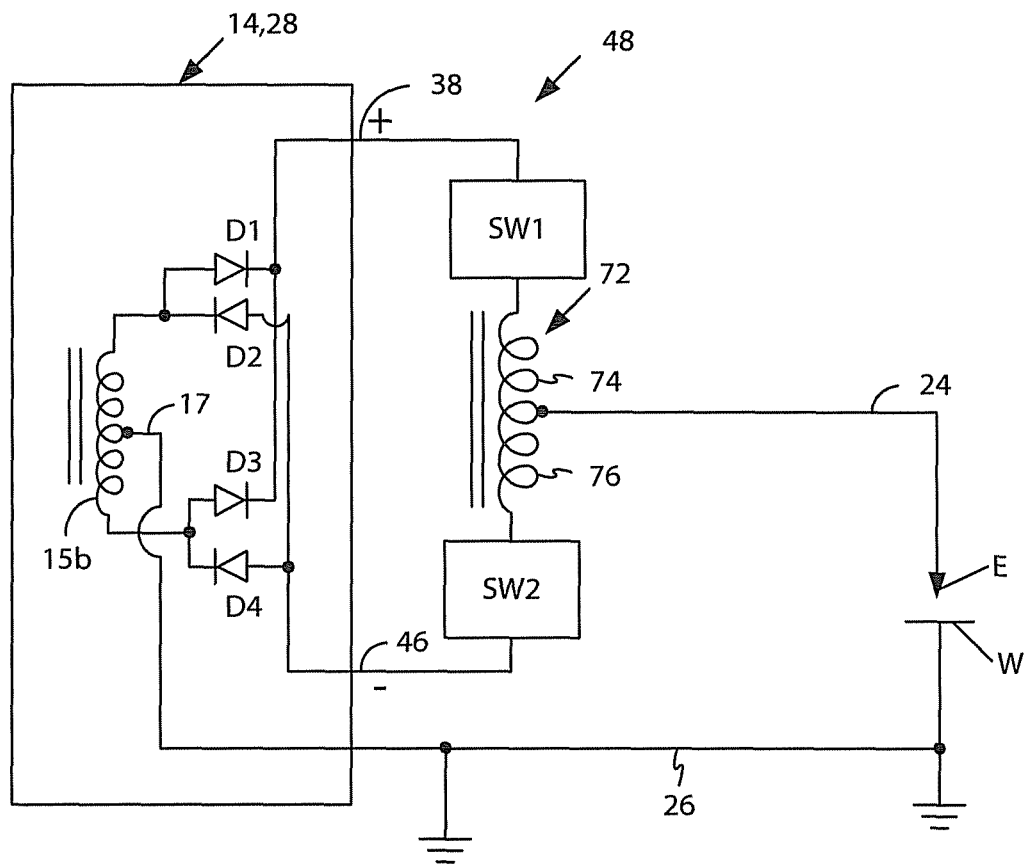
FIG. 2B is a simplified circuit diagram of the exemplary variable polarity switch shown in FIG. 2A.

The variable polarity switch 16 can be any switching device capable of creating alternating polarity signals on output lines 24, 26. For example, FIG. 2A shows an exemplary variable polarity switch 16 with a positive rectifier circuit 28 having diodes D1, D2, D3 and D4 to create a positive output terminal 38 and a negative output terminal 46 connected to an output switching network 48. Output switching network 48 includes two transistor type switches SW1 and SW2, usually in the form of insulated-gate bipolar transistors (IGBTs) that can be turned on and off according to the logic on base lines 55, 56. To dissipate high voltages when switches SW1, SW2 are off, snubber networks 57, 58 are connected across the switches SW1, SW2. Network 48 can be used for pulsating high welding currents substantially over 200 amperes. A single output inductor 72 is divided into positive pulse section 74 and negative pulse section 76. In this manner, an AC current is created in output lines 24, 26 connected to electrode E and workpiece W. By alternating the logic on base control lines 55, 56 in succession, an alternating current is applied to the welding circuit including electrode E and workpiece W. A simplified circuit illustrating the transformer 14, rectifier circuit 28, switching network 48, and inductor 72 is shown in FIG. 2B.

Figure 2C:
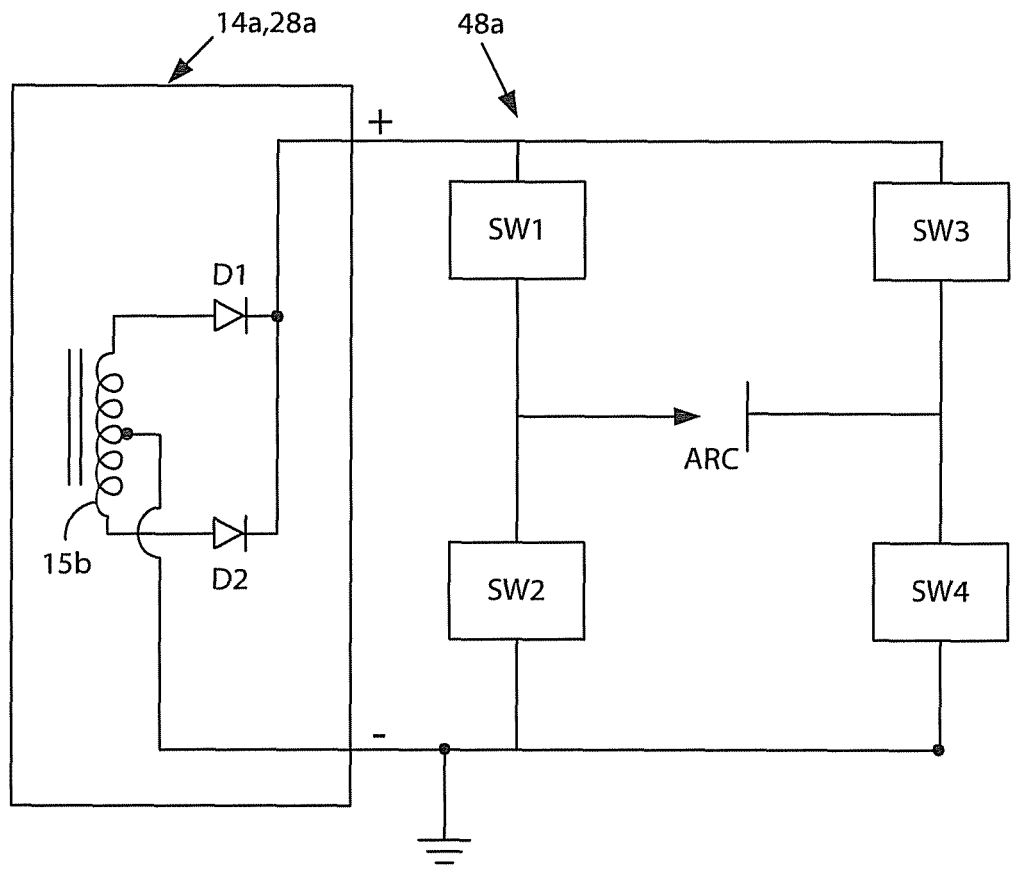
FIG. 2C is another simplified circuit diagram of another exemplary variable polarity switch.

In another embodiment, the variable polarity switch 16 may include a simplified circuit as shown in FIG. 2C, illustrating a transformer 14a, a rectifier circuit 28a, and switches SW1, SW2, SW3, and SW4 of switching network 48a. In this embodiment, when SW1 and SW4 are turned on, the arc is positive polarity and when SW2 and SW3 are turned on, the arc is negative polarity.

By using the variable polarity switch 16, as shown in FIG. 1, a controlled high frequency alternating current is created at electrode E. The high frequency is determined by the frequency at which the logic alternates on base control lines 55, 56. The logic on these lines may be generated by a software program or subroutine processed by a microprocessor in, for example, a wave shape generator or wave shaper. A block diagram of an exemplary program is shown in FIG. 2D, and may be incorporated with various variable polarity switches and switching networks, including those mentioned above.

Figure 2D:
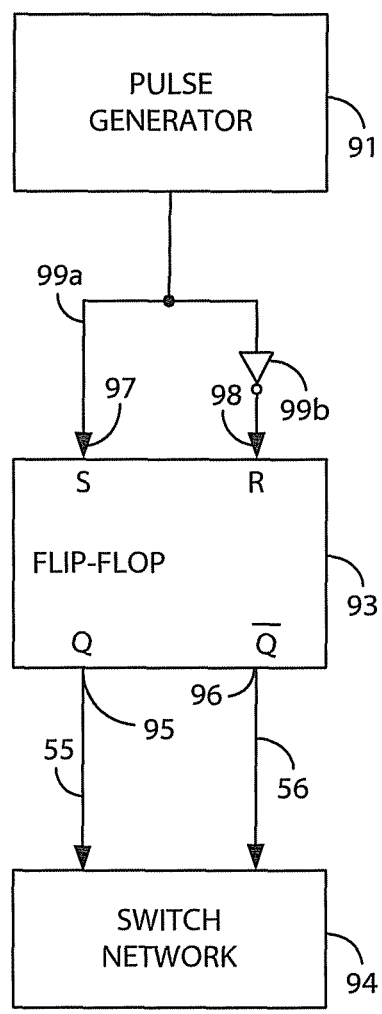
FIG. 2D is a wiring and block diagram of an exemplary subroutine modifying a portion of the system shown in FIGS. 2A-2C.

Referring to FIG. 2D, an exemplary pulse generator 91, flip-flop 93, and switch network 94 are shown. Flip-flop 93 is a software program to produce alternating logic in base control lines 55, 56 at a desired high frequency. Flip-flop 93 controls the alternate switching of the switching network 94 (e.g., switching network 48 of FIGS. 2A and 2B or switching network 48a of FIG. 2C) at a high frequency to produce a high frequency output of the switching network 94. The logic in lines 55, 56 is the output of non-coincident terminals 95, 96 of flip-flop 93. The logic on these terminals is alternated according to the logic at either the set terminal 97 or the reset terminal 98. To change the logic on lines 55, 56, the logic on terminals 97, 98 are reversed at a frequency determined by pulse generator 91. This is the high frequency for alternating the logic on lines 55, 56, which is the frequency of the welding current at electrode E. The output of the pulse generator 91 is the logic on line 99a connected to set terminal 97 and through inverter 99b to reset terminal 98. A positive pulse at the output of pulse generator 91 sets flip-flop 93 to create a logic 1 in line 55. A logic 0 at the output of pulse generator 91 has the reverse effect and creates a logic 1 at terminal 98 and, thus, a logic 1 at the inverted output terminal 96 to produce a logic 1 in line 56. A logic 1 in line 55 or line 56 turns on the associated switches of switching network 94 (e.g., switching network 48 of FIGS. 2A and 2B or switching network 48a of FIG. 2C). When the logic 1 shifts to the opposite output line, the switch immediately turns off.

Referring back to FIG. 1, arc current is read by sensor 52 to create a voltage in line 52a representing arc current $I_a$. In a like manner, arc voltage is sensed by sensor 54 to create a voltage on line 54a representative of arc voltage $V_a$. In accordance with standard practice, a digital processing device represented as controller 60 is connected to power supply 10 to create pulses in accordance with the feedback current and/or voltage. Controller 60 is illustrated as including a pulse width modulator 62 driven by oscillator 64 having a frequency exceeding 100 kHz. The pulse width modulator produces a current pulse during each output of the oscillator. The pulse width determines the amplitude of the current pulse. The level of current during the welding cycle includes many pulses from pulse width modulator 62, so the current follows the voltage on line 66, illustrated as the output of error amplifier 68, which also receives a command signal on line 70. As so far described, welder A is a welder with controller 60 controlling the wave shape of the current pulses and variable polarity switch 16 controlling switching and polarity, which both contribute to defining the welding cycle at gap g, referred to as the welding arc. The voltage on line 70 determines the profile, shape, or contour of the current pulses of the welding process. As popularized by the Power Wave welder sold by The Lincoln Electric Company, the voltage on line 70 is controlled by a wave shaper or generator 80. Without modulation from modulator 100, output 92 of the wave shape generator 80 dictates the voltage on line 70.

In accordance with the invention, wave shaper 80 controls the signal on line 92 to alternate between a high energy portion and a low energy portion at a low frequency. In this manner, the heat applied to the weld puddle of the workpiece W can be controlled and modulated to achieve the "stacked dime" appearance at faster speeds and without undesirable characteristics, such as, for example, spattering and stubbing, as mentioned above. In particular, controlling the heat in the workpiece W, for example, by not letting it get too hot, allows welding to go faster without spattering. The high energy portion is dictated by a signal on line 82 from the shape selector or software 82a. In a like manner, the signal on line 84 controls the low energy portion of the welding process under control of shape selector or software 84a. These shape selectors dictate, in one aspect of the invention, the shape of the high frequency pulses used in the welding process. A weld cycle in the welding process involves alternating between selector 82a and selector 84a at a low frequency. Control logic 90, shown in FIG. 4 and described in more detail below, repeatedly initiates software or selectors 82a and 84a in sequence. In some embodiments, the wave shape generator or wave shaper 80 may include selectors 82a, 84a and control logic 90, and any other logic that creates the desired waveform. In this manner, the high frequency pulses occur throughout the high energy and low energy portions of the wave cycle, where the high energy and low energy groups of pulses alternate at a low frequency.

Figure 3:
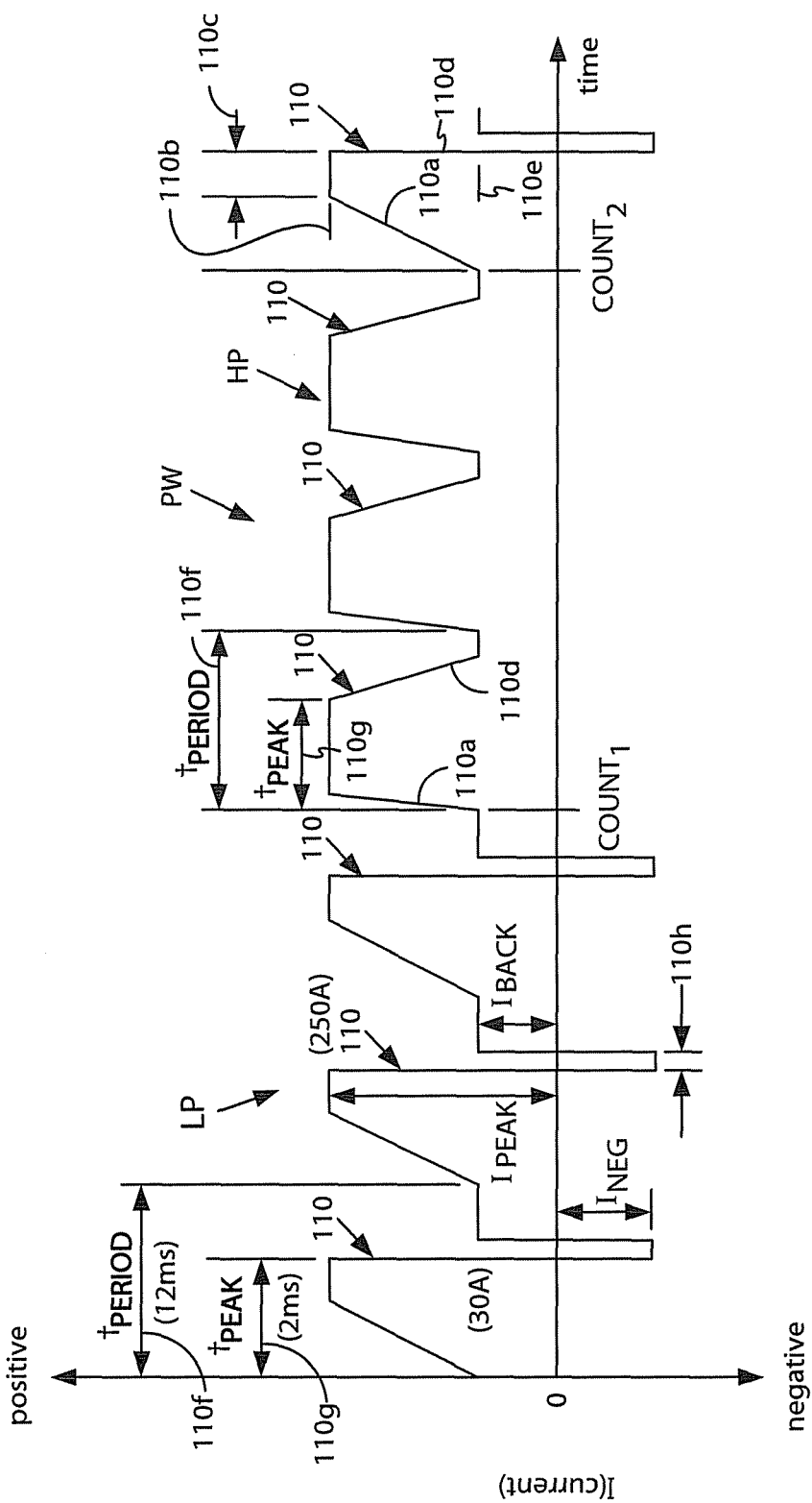
FIG. 3 is a current graph illustrating the high frequency pulses and negative polarity components used in an embodiment of the present invention.

The waveform current graph shown in FIG. 3 is an embodiment achieved by having wave shaper 80 control the high energy and low energy portions of the welding cycle. The high and low energy portions of the waveform are achieved by alternately actuating selectors 82a, 84a at a low frequency to output a signal to create the waveform of FIG. 3, in combination with the variable polarity switch 16 control lines 55, 56 (discussed above). The particular shapes of the high frequency pulses within the high and low energy portions of the waveform are defined by control logic 90, shown in FIG. 4. The high energy portion is defined by 82a and the low energy portion is defined by 84a, as discussed in detail below.

In addition, as will be explained in detail below, alternative embodiments of the invention utilize modulator 100 for producing one of several repeating modulation curves having a variety of magnitude alternating shapes to create high and low energy portions of the waveform. For example, a sine wave from selector block 102, an alternating current or square wave by selector block 104, or a saw tooth curve from selector block 106. The selector blocks cause modulation by a curve from modulator 100. This curve is outputted on line 108. As will be explained below, with respect to FIG. 9, the modulated signal from line 108 is obtained by multiplying a feature of the signal on line 92 by a curve represented by one of the blocks 102, 104, 106. This process produces a low frequency modulated weld cycle. Modulation of the signal on line 92, via modulator 100, may be combined with any of the embodiments described herein.

The embodiment illustrated by the current graph in FIG. 3 does not utilize the curve modulator 100. In this embodiment, wave shaper 80 has an output 92 for controlling the voltage of the current command signal on line 70 and outputs 55, 56 for controlling the variable polarity switch 16. In accordance with this embodiment, pulse wave PW is formed by wave shaper 80 into a low energy portion LP, terminating after a certain number of pulses $COUNT_1$, and a high energy portion HP, terminating after a certain number of pulses $COUNT_2$. The pulses in the high energy portion HP are controlled by the shape selector or software 82a of FIG. 1 and the pulses in the low energy portion LP are controlled by the shape selector or software 84a in FIG. 1.

In FIG. 3, the low energy portion LP is shown with negative polarity portions of the high frequency pulses. Changing the polarity of portions of the pulses, between positive and negative, allows for greater control of heat dissipation and weld puddle modulation. The behaviors and heating characteristics of the cathode and the anode are not the same. During welding, the heat generated at the cathode and the heat generated at the anode are significantly different. When the polarity of the pulse wave PW is reversed (e.g., switched from positive to negative or from negative to positive, as shown in FIG. 3), the anode and cathode are exchanged, which causes the heating characteristics of these regions to reverse.

Figure 3A:
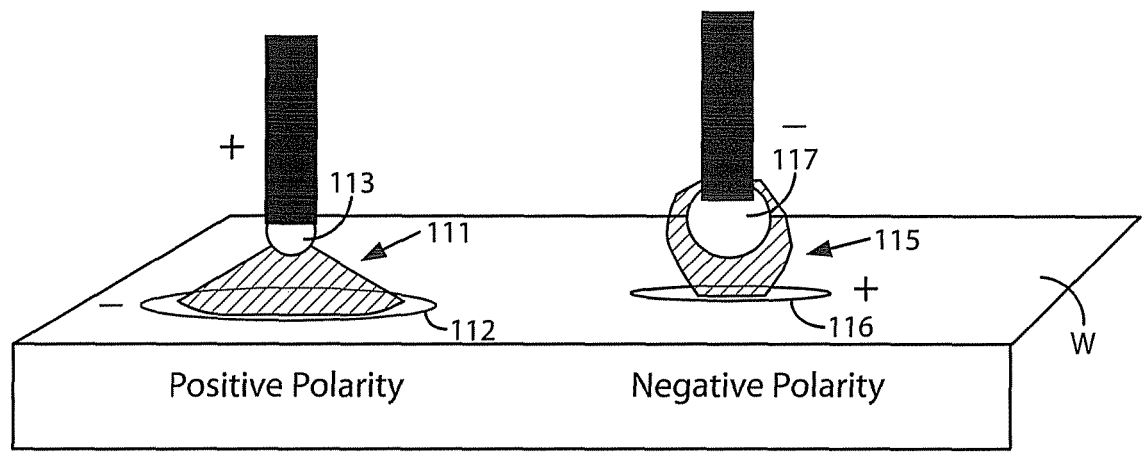
FIG. 3A is a drawing of exemplary welding arcs showing positive and negative polarity effects.

FIG. 3A is a drawing of exemplary welding arcs that highlights some of the differences between the arcs during positive and negative polarity portions of the pulse wave PW. In general, although welding always adds heat to the workpiece W, negative polarity portions of the weld cycle add less heat to the puddle of the workpiece W than positive polarity portions. During a positive polarity portion, an arc 111 spreads across a puddle 112, heating up a wide area. On the positive electrode side, the arc 111 is concentrated at the bottom of droplet 113. The current flows through the droplet and its associated magnetic pinch force acts on the liquid droplet 113, thus eventually pulling it from the wire to the workpiece W. However, during a negative polarity portion, an arc 115 is concentrated on the center of a puddle 116, allowing the edges to cool off and start to solidify. On the negative electrode side, the arc 115 covers much more of the end of the electrode, heating up a large droplet 117. In this manner, much of the current does not flow through the droplet 117, and its associated pinch force is not applied to the liquid droplet 117, so it hangs at the end of the wire, getting bigger. This large liquid droplet 117 is transferred to the workpiece W with the next positive polarity pulse peak. Negative polarity increases the burn-off rate of the electrode E as heat is built up in the electrode E, which allows the weld puddle to cool off. Therefore, when the current has a positive polarity, most of the heat is then dissipated or absorbed into the weld puddle of the workpiece W. When the current has a negative polarity, more of the heat is dissipated or absorbed into the electrode E, with much less heat dissipated into the weld puddle. Relatively small negative polarity portions of the pulse wave PW can significantly increase the heating difference of the workpiece W between the high energy (high heat) portion HP and the low energy (low heat) portion LP of the pulse wave PW. This difference in heating achieves the stacked dimes appearance of the weld bead on the workpiece W. For example, adding portions of negative polarity to the low energy portion LP of the pulse wave PW results in a greater difference between the heat dissipated into the weld puddle of the workpiece W during the low energy portion LP and the high energy portion HP, which allows the weld puddle to cool more during the low energy portions, achieving a stacked bead appearance at speeds faster than those achievable without the greater difference in energy (and heat).

In some embodiments, the low energy portion LP and high energy portion HP of the weld cycle may be created by varying certain parameters of the pulse wave PW between the low energy portion LP and the high energy portion HP, while other parameters remain the same. In one embodiment, referring back to FIG. 3, pulse wave PW alternates between the low energy portion LP and high energy portion HP to define a weld cycle. These cycles are repeated during the welding process. In this embodiment, during the low energy portion LP and the high energy portion HP, the peak current 110b, peak time 110g, background current 110e, and the period 110f remain the same. High and low energy pulses are differentiated from each other by the shapes (e.g., slopes) of the ramp-up and ramp-down portions of the peak period and the incorporation of a negative polarity component. Pulses 110 of the embodiment shown in FIG. 3 are created by wave shaper 80 at a frequency in the range of 50-400 Hz. For example, this frequency can be selected in an effort to optimize the pulse rate with the droplet rate of the molten aluminum. The pulse rate contributes to the heat of the weld and the heat in the weld puddle. These two aspects should be coordinated. Each pulse has a ramp up portion 110a with a controlled slope, a peak current ($I_{PEAK}$) 110b, which is the same for all pulses shown, a peak time portion 110c, which is the time that the current level is at a peak, a ramp down portion 110d, and a background current ($I_{BACK}$) portion 110e, which, when not interrupted by a pulse or negative current component, is constant. The ramp up time 110a is included in the peak time. Although the peak current 110b, peak time 110g, and the period 110f remain the same, the amount of time that the pulse is at the peak current ($I_{PEAK}$) 110b is dictated by the slope of the ramp up portion 110a.

Although the pulses generally are made up of positive polarity components, some pulses may include negative polarity portions or components. A pulse with a negative component includes a negative current ($I_{NEG}$) for a negative portion time 110h. Although not shown in FIG. 3, the shape of the negative polarity components may also include various slopes associated with the ramp down to the negative current and the ramp up from the negative current. In addition, a negative polarity portion may be introduced anywhere in the pulse wave PW, including during the high energy portion HP. The negative current components may be viewed as troughs of negative heat, during which more heat is dissipated into the electrode E, as discussed in detail above. Therefore, in addition to the variable ramp up portion 110a and variable ramp down portion 110d, the selective presence of negative components with negative current ($I_{NEG}$) for a negative portion time 110h determines the amount of heat dissipated in the electrode E and workpiece W. In other words, the resultant weld cycle or pulse wave PW includes pulses 110 that have different areas, and thus generate different amounts of heat in the workpiece W. Negative components (and their associated area) can be viewed as negative contributors to the heat dissipated in the workpiece W.

Thus, to change the amount of heat a pulse dissipates into the workpiece W, especially during the low energy portion LP, a negative current portion can be introduced for a negative portion time 110h. As mentioned above, this is because during negative polarity, the heat is dissipated at the electrode E, instead of at the workpiece W. A pulse with a negative current portion for time 110h dissipates less energy and heat into the workpiece W, as compared to a pulse without a negative current portion. Selective use of negative current portions, for example in each pulse of the low energy portion LP, allows for a greater energy difference between the low energy portion LP and the high energy portion HP of the pulse wave PW.

The incorporation of negative current portions into the pulse profile may also be combined with other pulse profiling techniques. For example, during the low energy portion LP, ramp up 110a is slow and ramp down 110d is fast. This gives a short time 110c and a long time when the background current 110e and/or the negative current portion is flowing across the arc at the welding gap g. Pulses 110 in high energy portion HP are typically larger in area. During the high energy portion HP, the times 110f and 110g are constant but ramp up 110a is fast and ramp down 110d is slow. In this manner, the polarity of the current, the slope of the leading edge, or ramp up, 110a and the trailing edge, or ramp down, 110d is adjusted by shape selectors or software 82a, 84a to create a series of low energy pulses and a series of high energy pulses with a pattern repeating in each weld cycle at a low frequency. The rate of heat dissipated into the workpiece W by the welding process is determined by the differences in the parameters of the two portions of current pulses and by the number constituting $COUNT_1$ and $COUNT_2$. When these count numbers are reached, the pulse wave PW shifts between the two energy portions of a weld cycle.

As mentioned above, the welding operation involves a weld cycle having a low energy portion LP and a high energy portion HP. The frequency at which these two portions alternate is low compared to the relatively high frequency of pulses 110. In practice, the frequency of the pulses is in the range of 50-400 Hz, whereas the alternating frequency between the high and low energy portions of pulse wave PW is in the range of ¼ to 40 Hz. The main aspect of this concept is that the high frequency is substantially greater than the low frequency. For example, if the high frequency is in the range of 300 Hz, the low frequency could be in the range of 20-30 Hz or any like ratios. To set the desired low frequency, pulses 110 in portions LP, HP are counted. The wave form of pulses 110 is shifted to the other portion awaiting the count of this next portion. The count numbers of each portion need not be the same; however, in some embodiments, they may be quite close.

Figure 4:
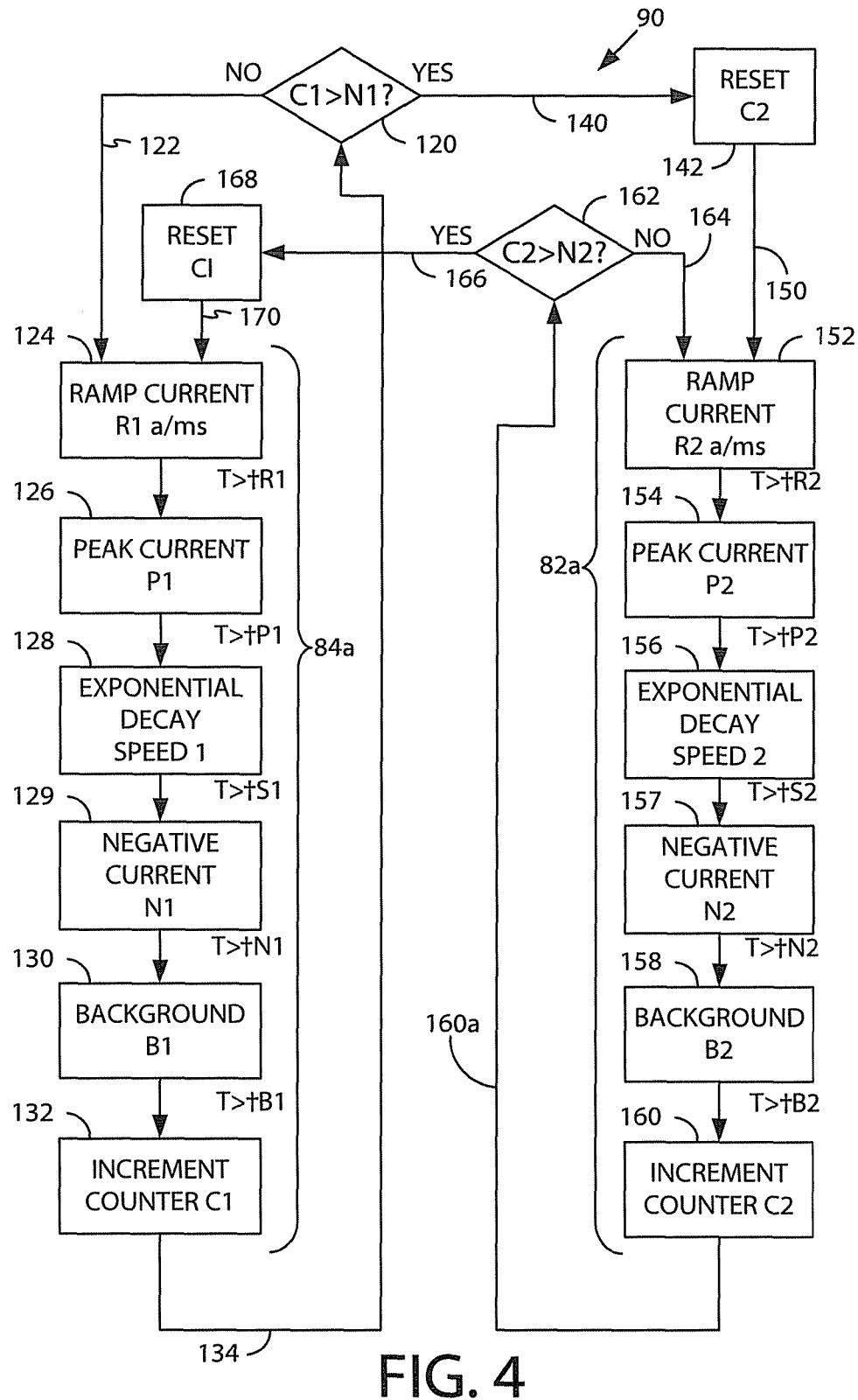
FIG. 4 is a logic diagram and flow chart to obtain the high frequency pulses and negative polarity components in FIG. 3 and used for implementation of the embodiment shown in FIG. 1.

To shift from one portion of the wave form to the other portion, control logic 90 is provided, as shown in FIG. 4. The wave shaper 80 and its associated selectors 82a, 84a and control logic 90 include waveform logic to define two parallel pulse sub routines—a high energy portion waveform and a low energy portion waveform, as discussed in detail below. For example, each sub routine consists of a state to define ramp up and peak (high current), a state to define the ramp down, a state to define any negative component, and a state to reset the cycle at the end of each pulse. Both sub routines can utilize a data table to define its operation at the specified wire feed speed. During each reset, (the last state in each high speed pulse cycle), logic determines if a counter has hit a limit and switch to the other sub routine. If the counter does not reach the limit, then the counter counts and the next pulse runs. The logic may be embodied in a software program, such as, for example, Lincoln Electric's Weld Development logic program, which is a state-based logic tree specifically for welding. Like other state-based programs, the logic may be in a state, running a function, say output current at 300 amps, until a conditional check becomes true (e.g., the peak timer>=2 milliseconds) and then the logic branches to the next state (defined in the conditional check). These state changes can occur very quickly, stringing together relatively complex logic without having to hard program the routine or change a PC board.

In FIG. 4, the left side of the logic (120, 168, 124, 126, 128, 129, 130, 132) is defined by 84a. The right side of the logic (162, 142, 152, 154, 156, 157, 158, 160) is defined by 82a. The counter flips back and forth between blocks 82a,

84*a* (as shown in FIG. 1). Counter 120 for COUNT C1 has a NO line 122 for initiating the low heat pulse profile of low energy portion LP shown in FIG. 3, which is controlled generally by operation of shaping selector or software 84*a*. The low energy pulse has a ramp up current with a slope that terminates at time tR1, as shown by step 124. Then the peak current portion P1 is implemented until time tP1, as shown at step 126. Thereafter, there is an exponential decay at a speed 1 until time tS1, as shown by step 128. Then the negative current N1 is implemented until time tN1, as shown at step 129. Background current B1 is maintained at a level as indicated by block or step 130. The time for the background current is tB1. This is the time between the end of the negative current and the start of the next ramp up, as shown in FIG. 3. This time is controlled by the slope of the ramp down portion 110*d* and the negative time tN1. By definition, tB1=$t_{PERIOD}$−tR1−tP1−tS1−tN1, i.e., the time left over after the other timed parameters. As mentioned above, the background current is maintained constant throughout the welding process embodiment shown in FIG. 3. At the end of the formation of a low energy pulse 110, block or step 132 increments the C1 counter as indicated by a signal in line 134. Although blocks 124, 126, 128, 129, 130, and 132 are shown in a particular order to represent the pulse profile shown in FIG. 3, the features represented by these blocks are not limited to this sequence or configuration. Many other combinations of these features may be used to form various pulse and weld cycle profiles. For example, blocks 129 and 130 may be reversed, such that the low energy pulse 110 created by software 84*a* employs the background current B1 before the negative current N1.

When counter 120 has been incremented to the set number N1, then a logic signal is received in line 140 to reset the C2 counter and start processing of high energy pulses of high energy portion HP shown in FIG. 3, which is controlled generally by operation of shaping selector or software 82*a*. This is portrayed by line 150 to activate blocks or steps 152, 154, and 156 in sequence to produce the ramp up, peak current, and ramp down of the high energy pulses in portion HP. Thereafter, the background current is maintained as indicated by step 158. Optional block 157 for negative current N2 during a high energy pulse is depicted in FIG. 4. Although not included in the pulse wave PW shown in FIG. 3, the inclusion of a negative current portion in a high energy pulse is included in alternative embodiments described below. The expiration times are used in practice to determine the shifting between the various portions of the wave shape constituting pulses 110. Background B2, which is equal to background B1, expires at the start of the next cycle and has a time tB2. Block or step 160 increments C2 counter by a logic in line 160*a*. If the count number of the high energy portion HP has not reached number N2, line 164 recreates the next high energy pulse. If counter 162 has counted out by reaching number N2, a logic signal in line 166 activates reset step 168 having an output 170 to initiate the first pulse of the next low energy portion LP of the pulse wave. Although blocks 152, 154, 156, 157, 158, and 160 are shown in a particular order to represent the pulse profile shown in FIG. 3, the features represented by these blocks are not limited to this sequence or configuration. Many other combinations of these features may be used to form various pulse and weld cycle profiles. For example, blocks 157 and 158 may be reversed, such that the high energy pulse 110 created by software 82*a* employs the background current B2 before the optional negative current N2.

By using the logic in FIG. 4, pulses 110 are first low energy pulses (constituting a low energy portion LP) and then high energy pulses (constituting a high energy portion HP) to complete a weld cycle. As mentioned above, the frequency of alternating the energy level is low compared to the high frequency of the individual pulses 110. This overlay of low frequency operation on high frequency pulse waves results in the advantages set forth above. As discussed in detail below, modulation of a pulse wave PW (see modulator 100 in FIG. 1) may also be used to achieve similar differences in energy between a high energy and low energy portions of the weld cycle.

Figure 5:
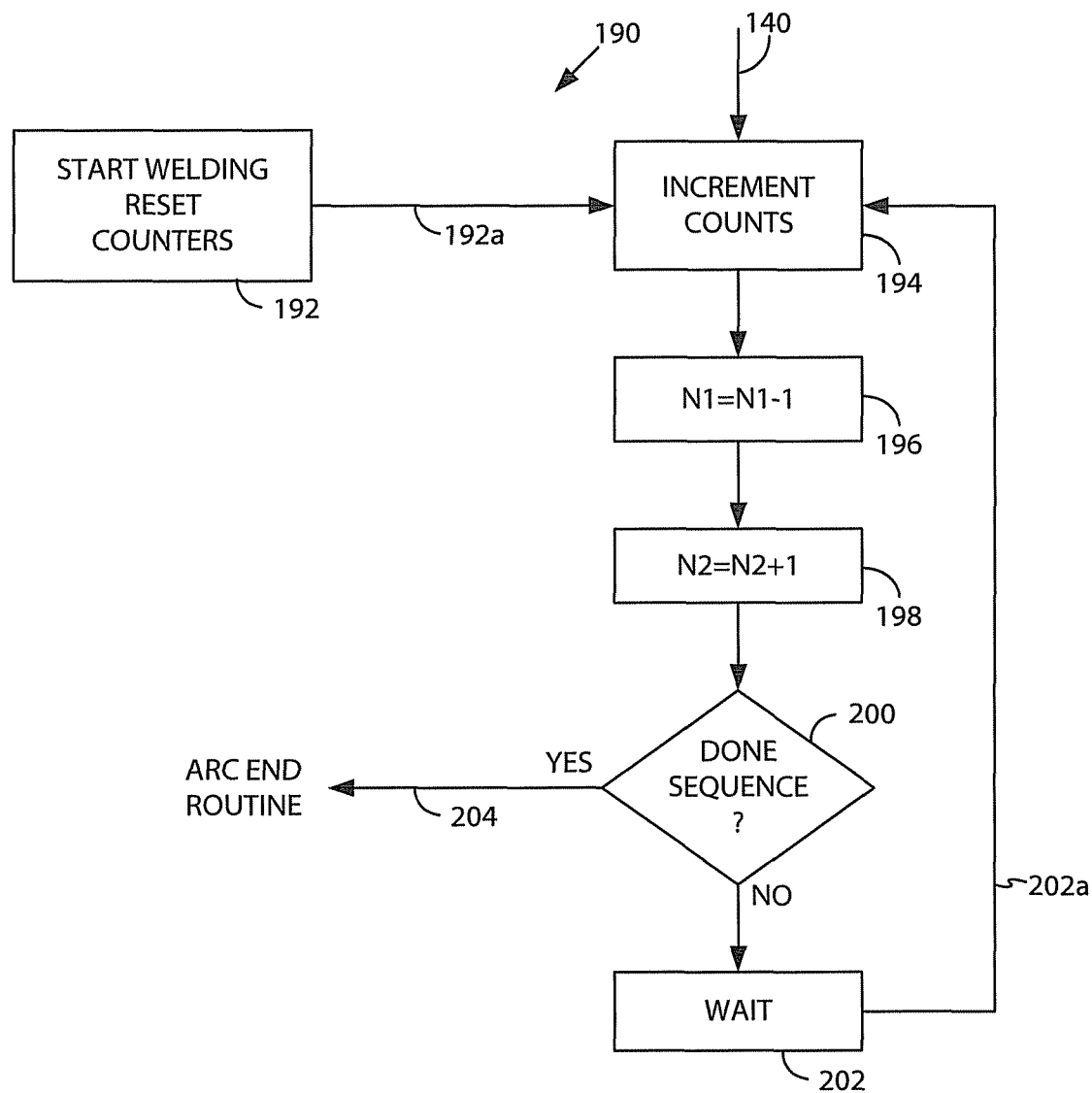
FIG. 5 is a logic diagram and flow chart of an exemplary addition to the flow chart of FIG. 4.

Referring now to FIG. 5 a supplemental control logic 190 is illustrated wherein the heat of the welding process (dissipated into the workpiece W) at the start of the weld is high and progressively decreases during welding. For example, this may be advantageous when starting a weld of aluminum or aluminum alloy. A heat taper down prevents melt-through at the end of the weld. A variety of control logics could be used for this purpose, however, in practice, a start welding sequence is indicated by block or step 192. With additional reference to FIG. 4, this step resets counter 120 at the start of a weld to a high number and resets counter 162 to a low number. Consequently, at the end of the welding process, the last few cycles have relatively low total heat input to prevent burn through, especially when welding aluminum. Line 192*a* from step 192 activates the increment count block or step 194. Upon conclusion of one of the energy portions, indicated by logic on line 140, block or step 194 causes count number N1 to decrement as indicated by block or step 196. At the same time, count number N2 increments as indicated by block 198. Another embodiment includes block 198 without block 196. Yet another embodiment includes block 196 without block 198. Yet another embodiment includes block 196 alone at the first half of the weld followed by having block 198 alone at the second half of the weld. This is done for a set sequence indicated by block 200. The sequence could be the end of the weld or a specific time or count of cycles during the welding process. In practice, it is set to the end of the weld process. If the sequence is not concluded, step 202 causes a signal in line 202*a* to continue increase in the heat of the weld cycle. When the sequence is completed, step 200 signal in line 204 creates a signal to end the subroutine. FIG. 5 is merely representative of a subroutine used for decreasing the heat from a high value at the start of the weld process to a lower value as the process progresses. This prevents unwanted melt through at the end of the weld cycle. FIGS. 4 and 5, like FIG. 1, show the invention in diagram form to disclose the digital processing software used to implement the invention.

Figure 6:
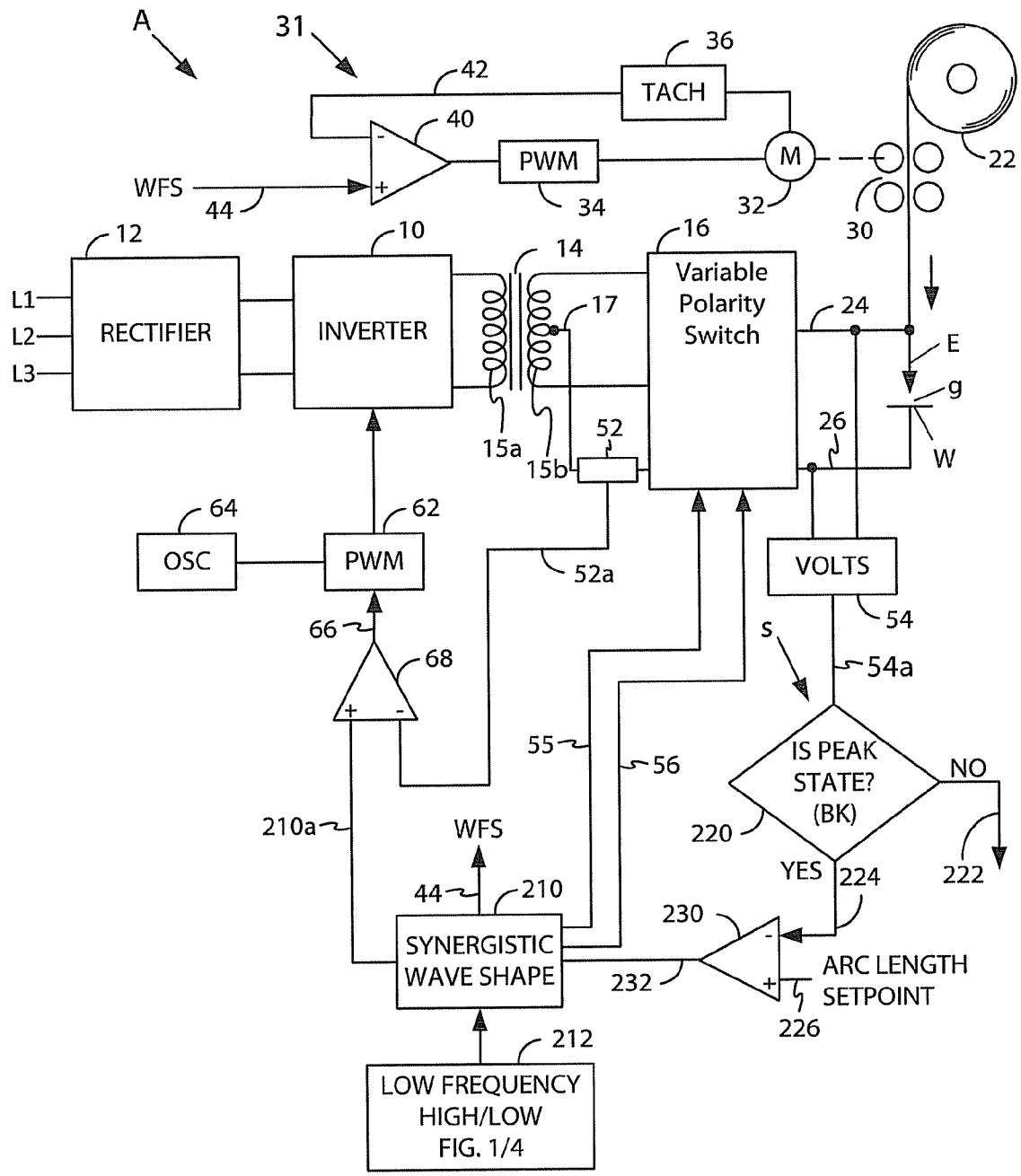
FIG. 6 is a flow chart and system architecture of an exemplary modification of the embodiment of the present invention as shown in FIG. 1.

A further modification of the invention is illustrated in FIG. 6, wherein a "synergistic" control action is implemented by wave shaper 210. The pulses created by this embodiment may be the same as those shown in FIG. 3, but may also generate other wave forms or cycles. As mentioned above, the pulses of a cycle alternate between high and low energy portions HP, LP. The previously described circuitry to obtain this wave shape is schematically represented as block 212, where 212 includes a look up table and the high/low modulation flips back and forth between a high WFS parameter set and a low WFS parameter set. Either parameter set may have a negative component to control the amount of heat created and dissipated to the workpiece W. In some embodiments, to increase the difference in heat between the high energy portion HP and the low energy portion LP, negative components may be included in only in the low energy portion LP. In other embodiments, larger negative components may be included in the low energy portion LP than in the high energy portion HP.

As shown in FIG. 6, welder A has the components described in connection with FIG. 1 and includes a wire feeder 30 so that wire E is fed into the welding operation in accordance with the level of the WFS signal on line 44. FIG. 6 includes the exemplary motor controller 31, as shown in FIG. 1A, but may also utilize any other suitable motor controller. In addition to the control described in relation to FIG. 1 above, wave shaper 210 controls the signal on line 44 so it has a high level when the high energy portion HP is being processed and a low level when the low energy portion LP is being processed. Portions HP and LP combine to produce a repeating low frequency weld cycle. Consequently, the modification shown in FIG. 6 merely adds to the previously described embodiment by outputting a voltage level on line 44 that tracks the energy level being processed by the welder A as shown in FIGS. 1-4. In this manner, there is a synergistic effect between the high and low energy portions HP, LP and the wire feed speed WFS of electrode E.

FIG. 6 also illustrates a further modification that may be used with the invention. As the arc length is increased by an operator or a robot, the heat is changed. To compensate for changes in the arc length, welder A is provided with a control system S wherein the voltage on line 54a is representative of the arc length. This measurement must be taken during a portion of pulses 110 where the current is normally constant and not subject to modulation. An example of such a portion is during the peak current ($I_{PEAK}$) or background current ($I_{BACK}$) that is maintained at a desired level. Consequently, discrimination block 220 reads the voltage on line 54a only during the peak current times, or the background current times. The signal on line 54a is discarded as indicated by line 220 at other times during pulse 110. Thus, the voltage read on line 224 is a constant peak current voltage that changes according to arc length variations. As the arc length increases the voltage increases. This signal representative of arc length is directed to error amplifier 230 by line 224 where it is compared to an arc length set point signal on line 226. The output of amplifier 230 in line 232 is the variation of the arc length from the set point. When the arc length is too low, the heat is increased. Consequently, synergistic wave shaper 210 has a subroutine reading the value on line 232 to change a parameter of the pulse wave PW, for example, of FIG. 3. For example, if the heat is too high, the wave shaper 210 can react by decreasing the heat in one or both of the high energy and low energy portions HP, LP of the pulse wave PW. For example, the wave shaper 210 can decrease the size of the pulse in the high energy portion HP by changing the characteristics of the high energy portion HP pulses. For example, these changes may include changing any combination of pulse features shown in blocks 152, 154, 156, 157, 158, and 160 of FIG. 4, including adding a negative polarity current. This decreases the heat. In a similar manner, changes in the characteristics of the low energy potion LP could have been made instead of or in addition to the changes in the high energy portion HP.

In a like manner, if the heat is too low as determined by a lower voltage on line 224, pulses 110 in the high energy portion HP may be increased in size. As mentioned above, increasing or decreasing the heat of either the low energy portion LP or high energy portion HP can be achieved using any combination of features mentioned above, such as, for example, adjustments to ramp up and ramp down slopes, negative times, or the addition or removal of a negative current component. Of course, the level of voltage on line 232 could also be used to change the count number of the high energy portion of the pulse wave to modify the heating to compensate for, and correct, variations in arc length. In summary, system S measures arc length and changes the heat of the welding process to compensate for variations in the arc length. In combination with these adjustments, the synergistic wave shaper 210 also outputs a signal on line 44 to correlate the feed speed of the wire with the heat being generated in the welding process. The wave shaper also controls the command signal on line 210a. Other synergistic modifications can be made to the wave shaper to accommodate various corrective actions and control functions in welder A. The arc length control system S may be used in the synergistic program or in control of the pulses as shown in FIGS. 1 and 3.

Figures 7, 7A:
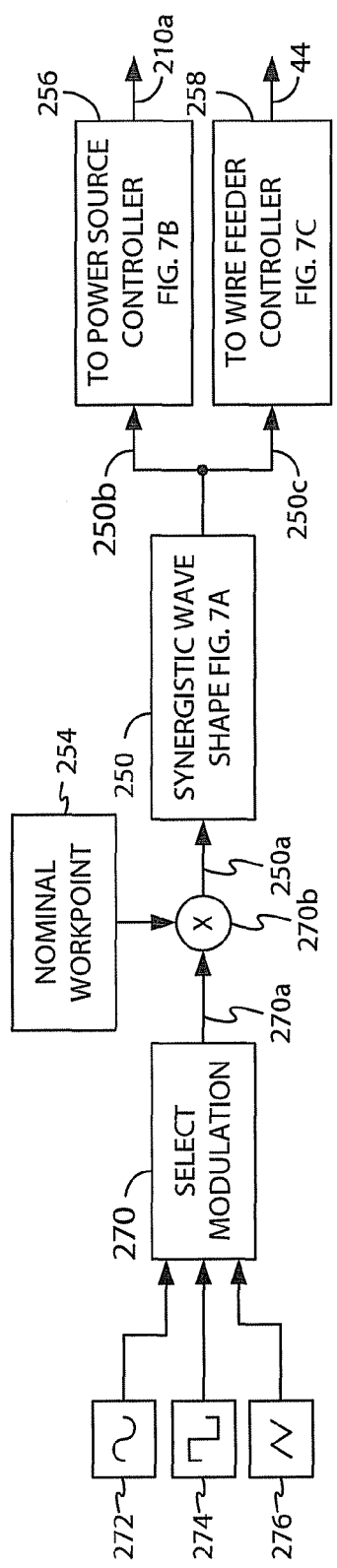
FIG. 7 is a block diagram of a further exemplary implementation of the present invention wherein both the pulse frequency and wire feed rate are coordinated by the look-up table shown in FIG. 7A to produce the results shown in the graphs of FIGS. 7B and 7C.
FIG. 7A is an exemplary look-up table with exemplary values for use with the embodiment shown in FIG. 7.

Other embodiments utilizing the concepts employed in the present invention are illustrated in FIGS. 7, 7A, 7B, and 7C. In contrast to the embodiments described in relation to FIGS. 3 and 4, various parameters, including peak current, peak time, and background current, may vary from one workpoint to another. In these embodiments, as shown in FIG. 7, a synergistic wave shaper 250 is employed to process a work point from look-up table 252 in accordance with the value of the input signal represented by line 250a. FIG. 7A shows a subset of exemplary workpoints and their associated exemplary parameters, which may not correspond to the parameter values shown in the referenced figures. The work point represented by the level of the signal on line 250a is output in accordance with the look-up table 252. The pulse features and wire feed speed for a selected work point are used to control the shape of the pulse by controller 256 and the wire feed speed by controller 258. For example, the pulse shapes as shown in FIG. 3 may be implemented by the wave shaper or controller 256 by a signal on line 210a. Coordinated with the power source signal 210a is a WFS signal on line 44 as directed by controller 258. The wave shaper 250 produces a wave shape and a wire feed speed determined by the work point of look-up table 252. The normal work point for the welder is output from selector 254 for communication with the wave shaper 250 and output lines 250b, 250c by input line 250a.

Figure 7B:
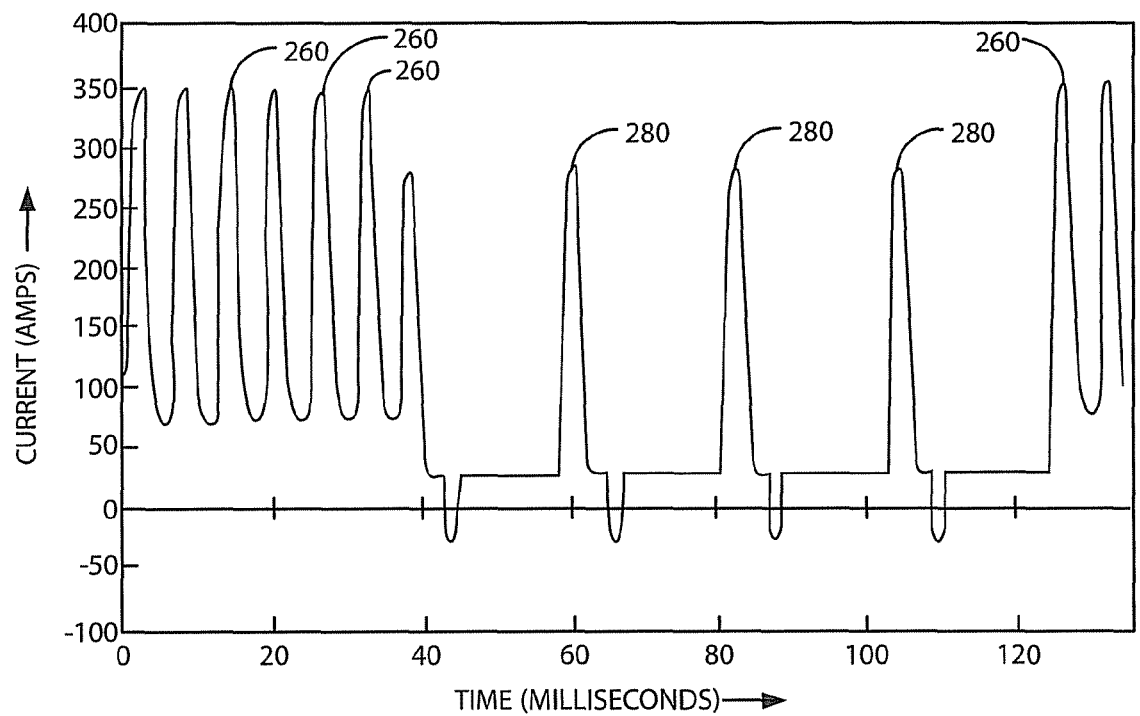
FIG. 7B is an exemplary current graph generated by the embodiment of FIG. 7.
Figure 7C:
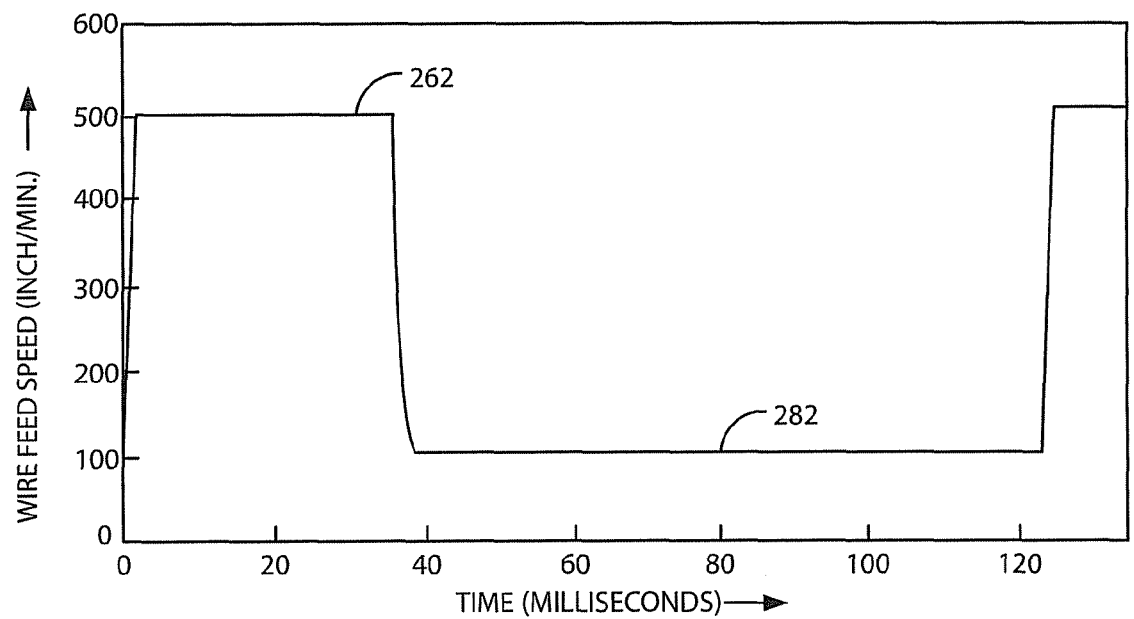
FIG. 7C is an exemplary wire feed speed graph generated by the embodiment of FIG. 7.

For example, in one embodiment, a workpoint may generate an output on line 210a from the look-up table 252 for a pre-selected series of high energy pulses having a shape as indicated by pulses 260 in FIG. 7B. At the same time, the output on line 44 from the look-up table 252 produces a WFS signal having a level 262 as shown in FIG. 7C. The high frequency pulses 260 and the wire feed speed WFS are controlled together. In accordance with this embodiment, the work point from table 252 is changed progressively during each weld cycle to generate high energy and low energy portions HP, LP of the weld cycle. Alternating these portions HP, LP produces a low frequency component to the welding process.

In the illustrated embodiment, modulator 270 has an alternating output line 270a that is multiplied with the set or normal workpoint from selector 254 by multiplier 270b. Thus, the level of voltage on line 250a is modulated according to the output of modulator 270. This modulator selects a repeating curve, such as, for example, a sine wave at selector block 272, a square wave at selector block 274, or a saw tooth wave at selector block 276. In the illustrated embodiment, the square wave of block 274 is selected so that the welding process has a weld cycle that shifts from one workpoint to the other at a low frequency in the general range of ¼-40 Hz. Referring back to FIGS. 7B and 7C, the low energy portion LP of the weld cycle includes pulses 280 and a low WFS level 282. As shown in FIG. 7B, pulses 280 include an exemplary negative polarity component. By shifting from one workpoint to the next selected workpoint and repeating this process, the high heat caused by pulses 260 is alternated with the low heat caused by pulses 280 at the low frequency. At the same time, the wave shaper causes the voltage level on line 44 to shift between high level 262 and low level 282 at the same low frequency. In the illustrated embodiment, the modulation from curve or block 274 has a longer low energy portion LP than the high energy portion HP. In addition, the pulses have a different frequency and the background current has a different level. When coordinating the wire feed speed with the high and low energy portions HP, LP, the limitation of equally spaced current pulses is not applicable or required. This is in contrast to the embodiment shown in FIG. 3, where the pulses have the same frequency and background current. A change in shape, or modulation, or both, may be used to alternate between high energy and low energy portions HP, LP. The embodiment of the invention shown in FIGS. 7, 7A, 7B, and 7C is used to illustrate a broad aspect of the invention where the repeating weld cycles are coordinated with the wire feed speed WFS to create drastic changes in the heat being delivered to the workpiece W through the arc. In addition, an arc length feedback system S, as shown in FIG. 6 for example, can be implemented with this exemplary welding process.

Figure 8:
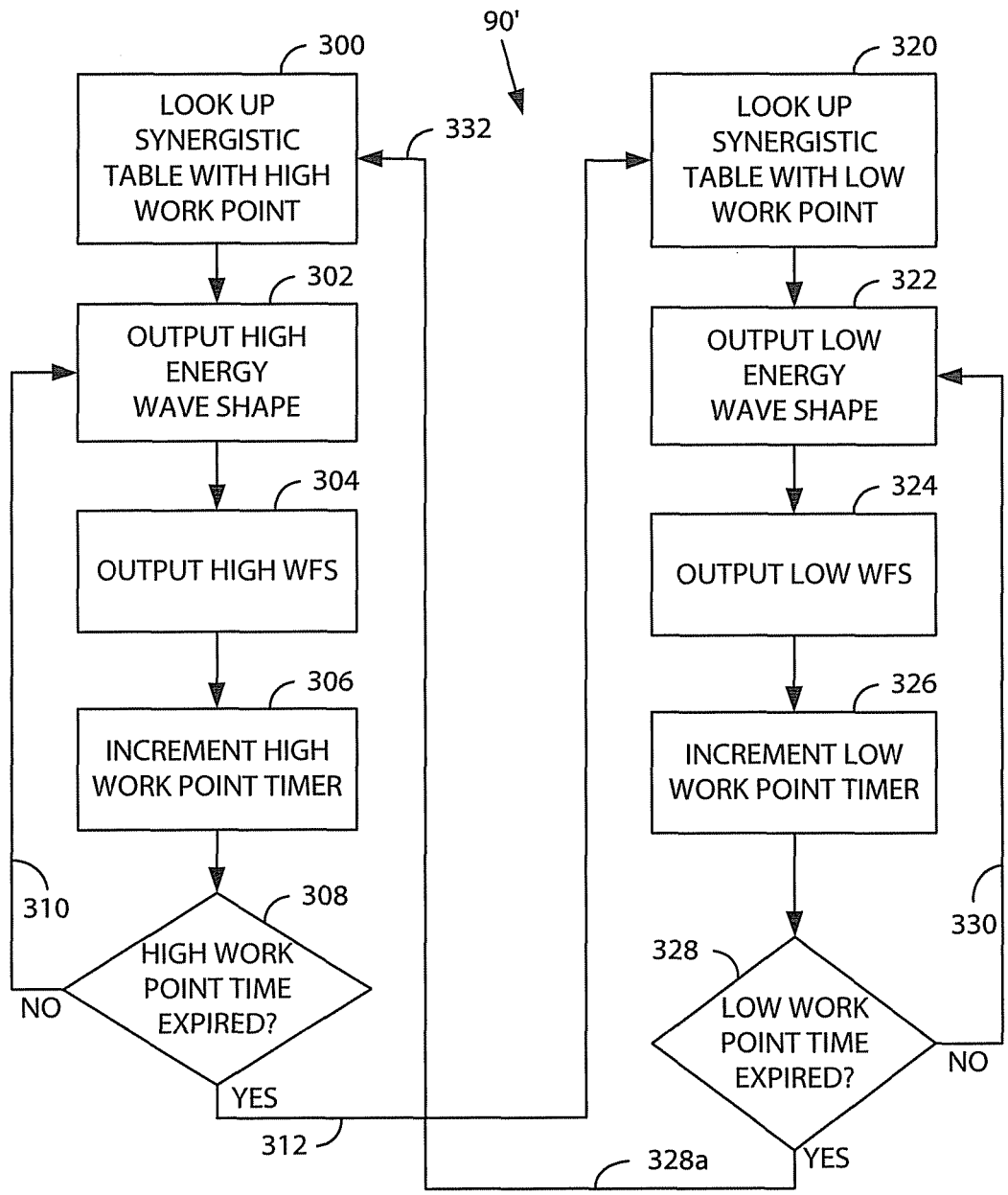
FIG. 8 is a logic diagram and flow chart similar to FIG. 4 for use with the exemplary embodiment of the invention illustrated in FIG. 7.

In another embodiment, a synergistic process that combines high and low energy control with wire feed speed control is shown in FIG. 8. Shifting between the high energy portion HP and the low energy portion LP is achieved by a timing operation, even though counting using control logic 90 of FIG. 4 could also be employed. The timing concept for the synergistic process involves control logic 90' having initiation of the high workpoint by step or block 300. At the start of the weld cycle, this step or block is implemented. The control logic 90' first interrogates the synergistic look-up table for the high workpoint. This high workpoint is selected as indicated by steps 302, 304 to create a shape control signal on line 210a from power source controller 256 in FIG. 7. Thereafter, the high wire feed speed WFS signal is outputted on line 44 from the wire feed speed controller 258. Then step 306 increments timer 308, set at a desired time. This desired time can be adjusted according to the arc length error signal in line 232 from control system S, as shown in FIG. 6. If timer 308 has not timed out, the high energy current pulses and the high wire feed speed WFS is continued as indicated by line 310. Ultimately, when timer 308 times out, a signal in line 312 activates step 320 to select the low workpoint from look-up table 252. This first implements the low energy pulses indicated by step 322 and then the low wire feed speed WFS for the wire feeder as indicated by step 324. Thereafter, step 326 increments set timer 328 and determines whether the timer has expired. If not, the low energy and low wire feed speed WFS cycle is continued as indicated by line 330. When timer 328 times out, the signal on line 328a activates step of block 332 to repeat the high energy and high wire feed speed WFS. By using control logic 90', the high feed speed and low feed speed are coordinated with the high energy and low energy at a low frequency. This timing function could be used as a substitute for the counting function in FIG. 4.

Figure 9:
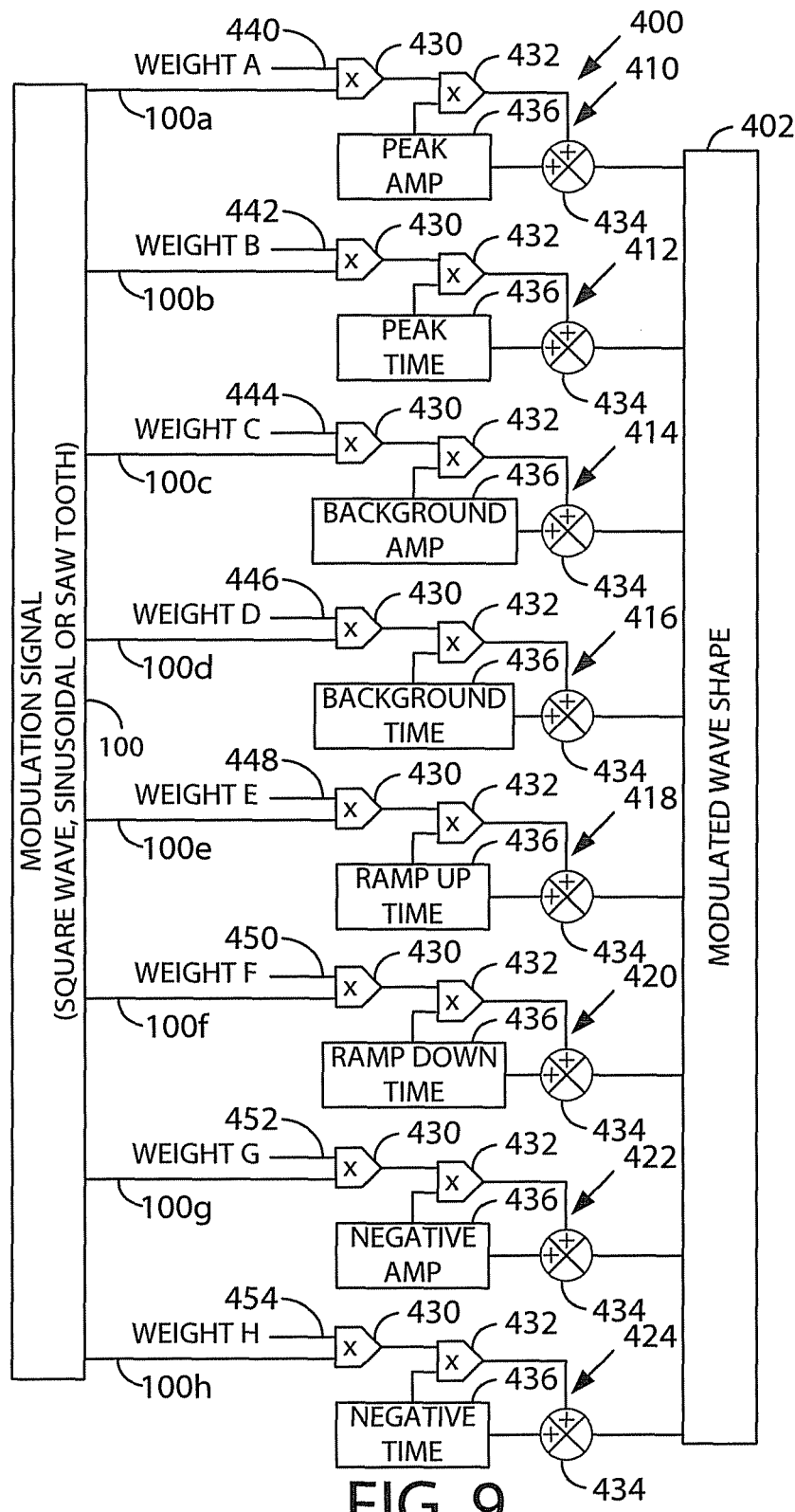
FIG. 9 is a block diagram and logic network used in practicing an exemplary embodiment of the present invention, as shown in FIG. 3 and illustrating schematically the modulation inputs of FIG. 1.

Modulation of the high frequency pulses by a repeating curvilinear factor or function at low frequency is an alternative to the mere high and low energy states as set forth in FIG. 3. This modulation technique is set forth in FIG. 9 wherein modulator 100 is driven by a selected curve, such as, for example, curve 102, 104, or 106, as indicated in FIG. 1 or curve 272, 274, or 276, as shown in FIG. 7. Modulation diagram 400 converts the selected low frequency undulating wave shape at modulator 100 into the desired pulse configuration to be output from modulated wave shaper 402. In an exemplary embodiment, various features of the pulses 110 are specifically processed by networks 410, 412, 414, 416, 418, 420, 422, and 424. Each of these networks includes multipliers 430, 432 and a summing junction 434. The particular aspect of the pulse being processed by the individual networks 410, 412, 414, 416, 418, 420, 422, and 424 is loaded into register 436. The individual networks have gain (weight) inputs 440, 442, 444, 446, 448, 450, 452, and 454 as one input of the multiplier 430. The other input is line 100a-100h, respectively. The voltage level or digital number on lines 440, 442, 444, 446, 448, 450, 452, and 454 is the weight to cause a particular change in a selected pulse feature. Network 410 has the peak current loaded into register 436. This may be portion 110b of pulse 110 as shown in FIG. 3. The peak time loaded into network 412 may be time 110c. Background current loaded into register 436 of network 414 may be current level 110e. The background time loaded into the register 436 of network 416 may be the time from the end of ramp down 110d or negative current time 110h to the start of ramp up 110a. The ramp up time may be the time from the start of the pulse to the peak current. This is processed by network 418. Network 420 processes the ramp down time loaded into register 436 of this network. Network 422 has the negative current loaded into register 436. The negative current time loaded into network 424 may be time 110h. The networks illustrated in FIG. 9 are representative in nature. Indeed, other implementations of the modulation concept could be used with different pulse parameters and in different combinations. Pulses 110, as shown in FIG. 3, may be processed as high energy pulses or as low energy pulses. This is an exemplary implementation. However, these pulses can also be modulated by modulator diagram 400 shown in FIG. 9.

Figure 10:
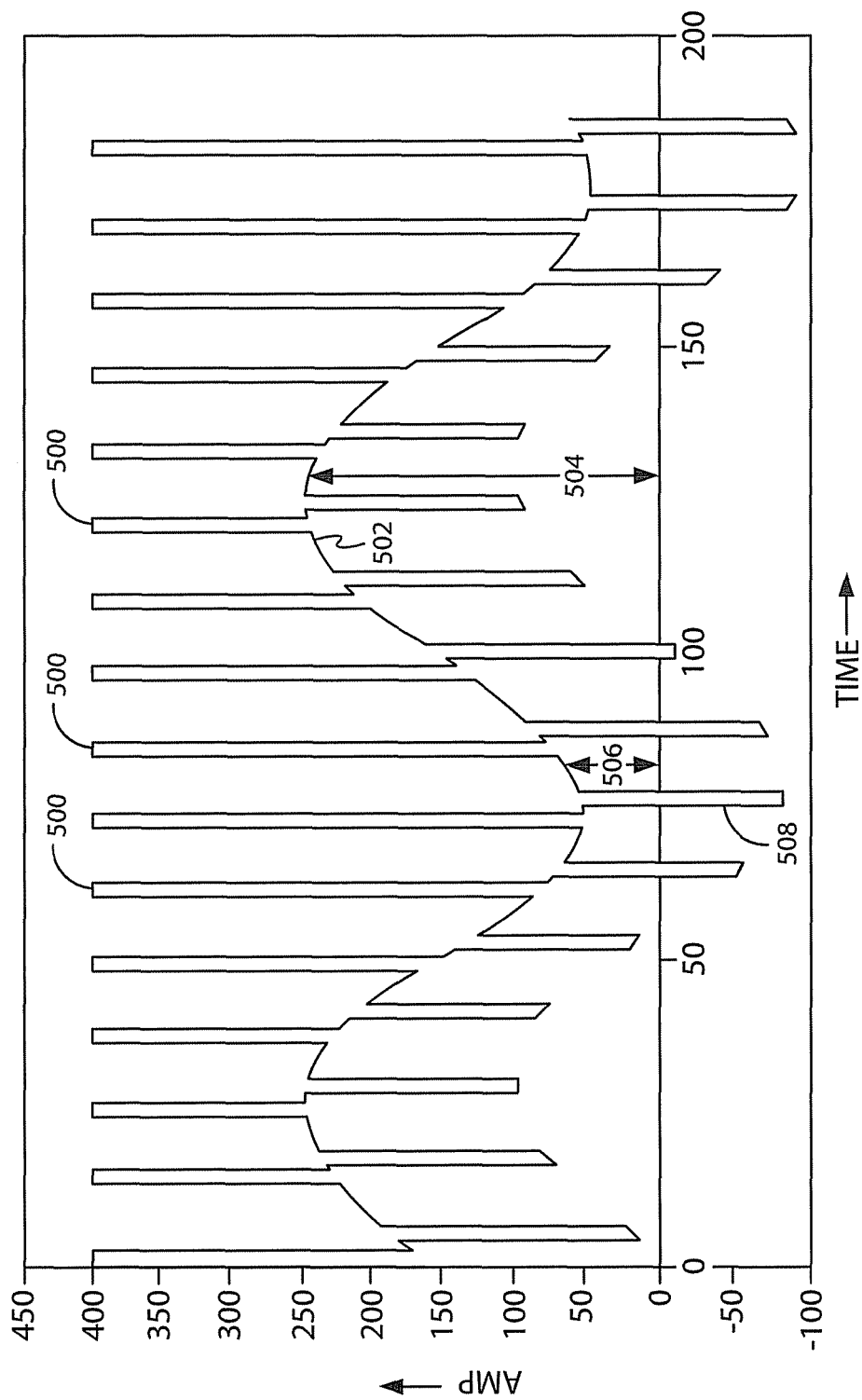
FIGS. 10-16 are exemplary current curves showing high frequency pulses and negative polarity components modulated specifically by uses of the diagram and logic network of FIG. 9.

An exemplary implementation of diagram 400 is shown with reference to FIG. 10. In this figure, equally spaced high frequency pulses 500 are combined with a modulated background current 502. This produces an alternation of a high energy portion 504 with a low energy portion 506. These portions are undulating according to a sine wave configuration as selected by modulator 100. In addition, the pulse wave PW includes current troughs, which at certain times are negative polarity components 508. Using a sine wave input, the sine wave appears in all lines 100a-100h to the inputs of multiplier 430 in each network 410, 412, 414, 416, 418, 420, 422, and 424. To obtain the wave shape shown in FIG. 10, the input on all lines 440, 442, 444, 446, 448, 450, 452, and 454, which are the weight or gain lines, is zero except for lines 444 and 452. The value of this input is a non-zero value. Consequently, the background current and negative current trace the sine wave on input lines 100c and 100g, respectively. The remainder of the pulse functions remain fixed and are not altered. The peak current, peak time, background time, negative time, ramp up time, and the ramp down time are the same for all pulses. Thus, the high and low energy portions 504, 506 are obtained merely by the modulation of the background current and negative current.

Figure 11:
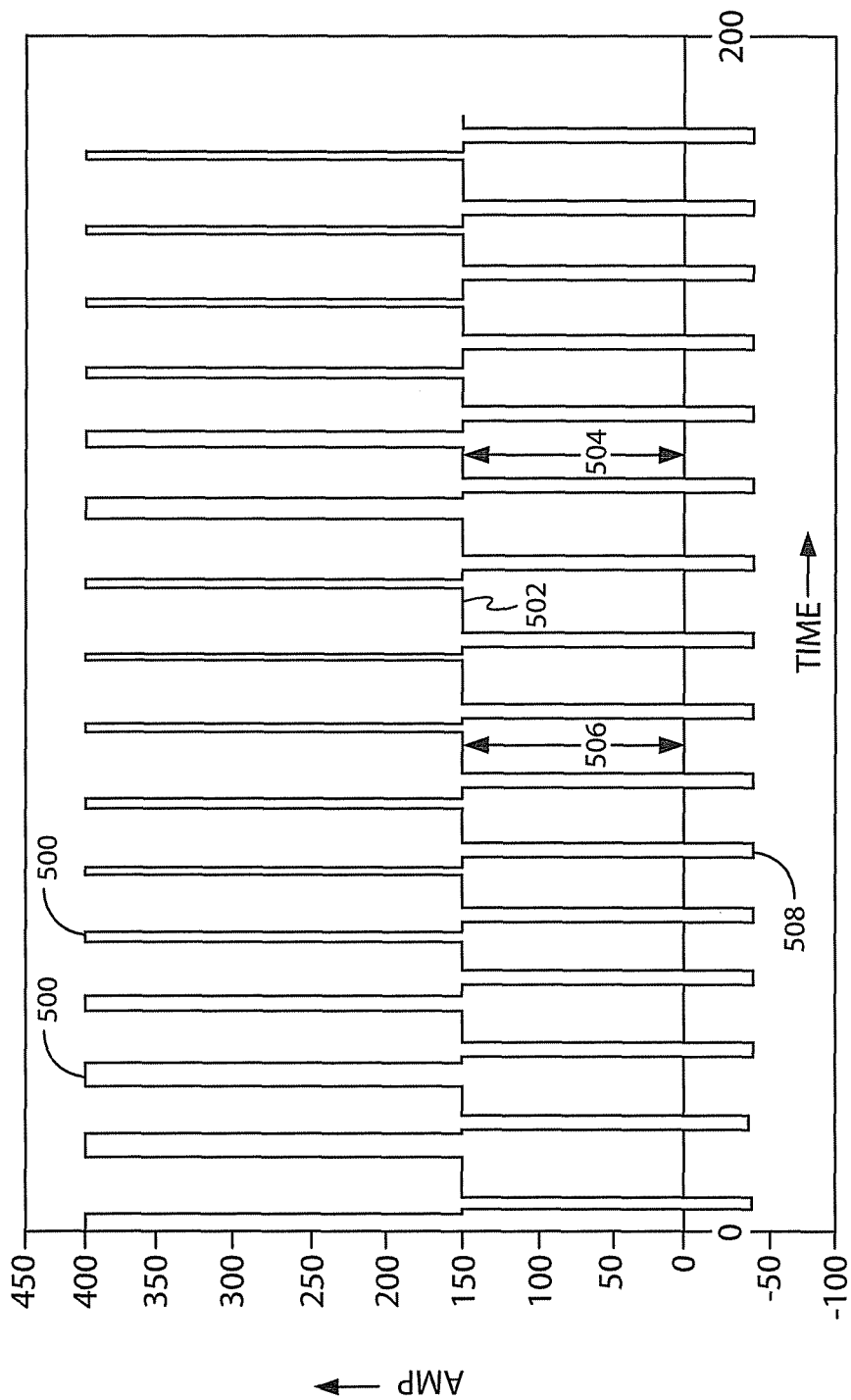
Figure 12:
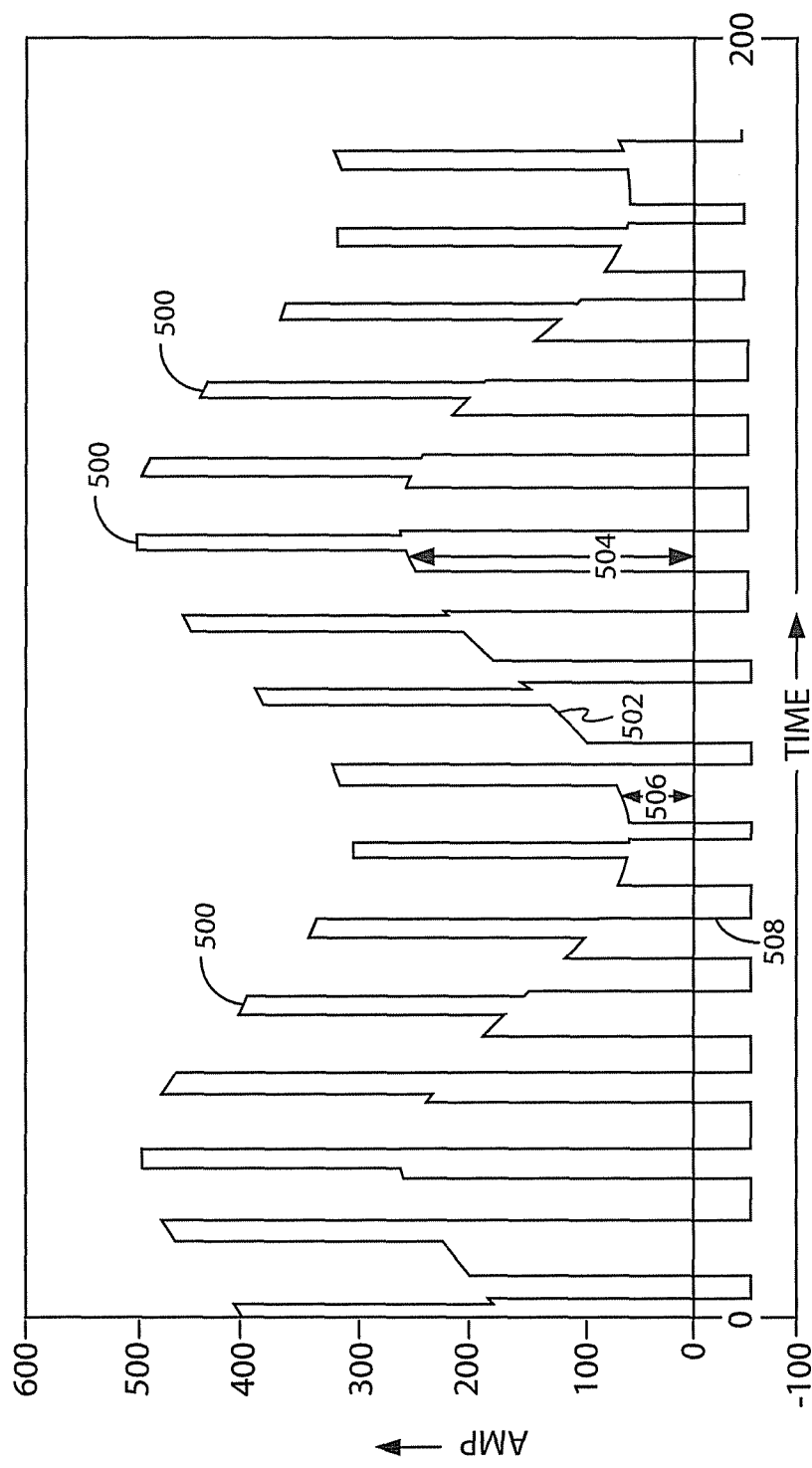
Figure 13:
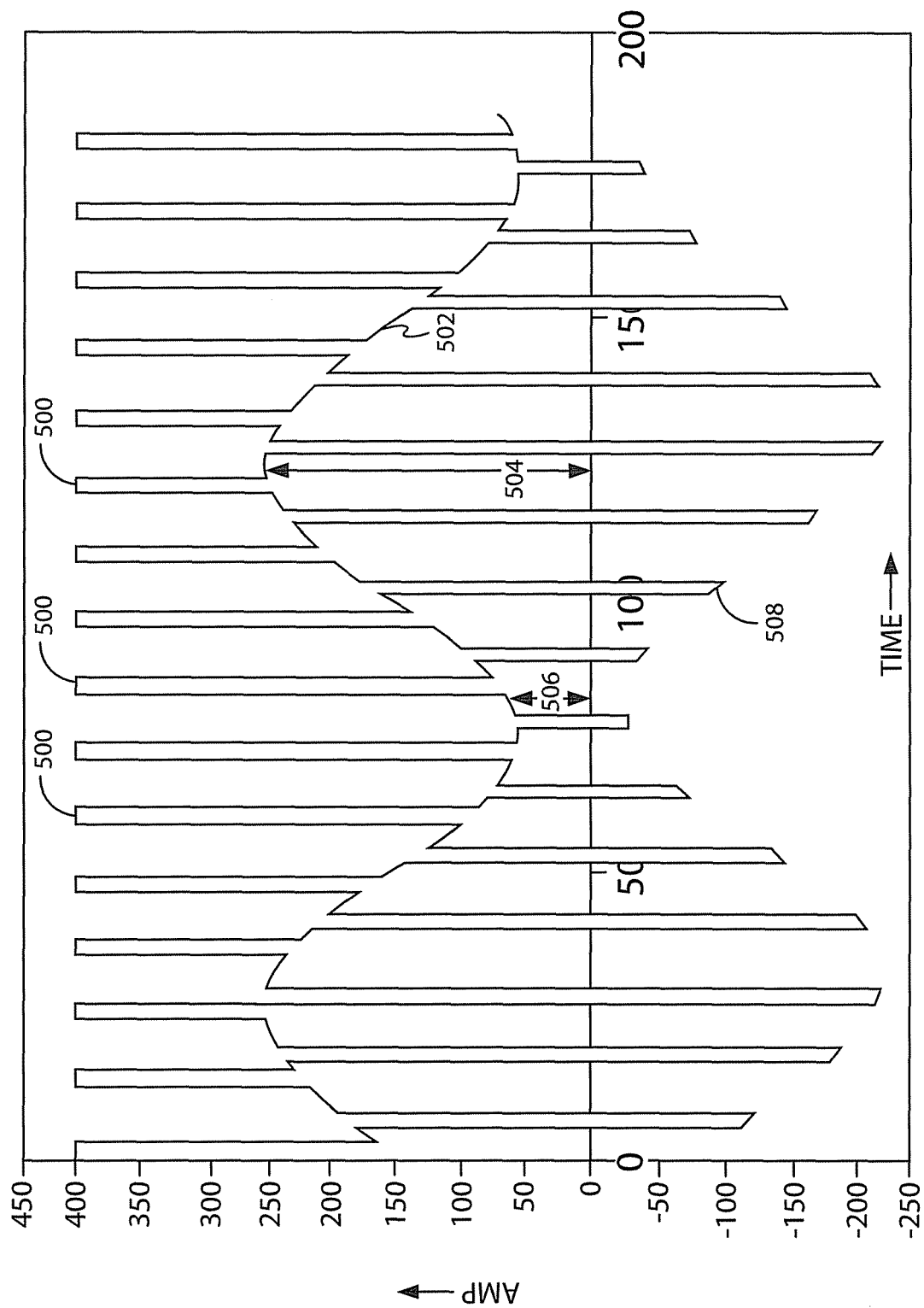
Figure 14:
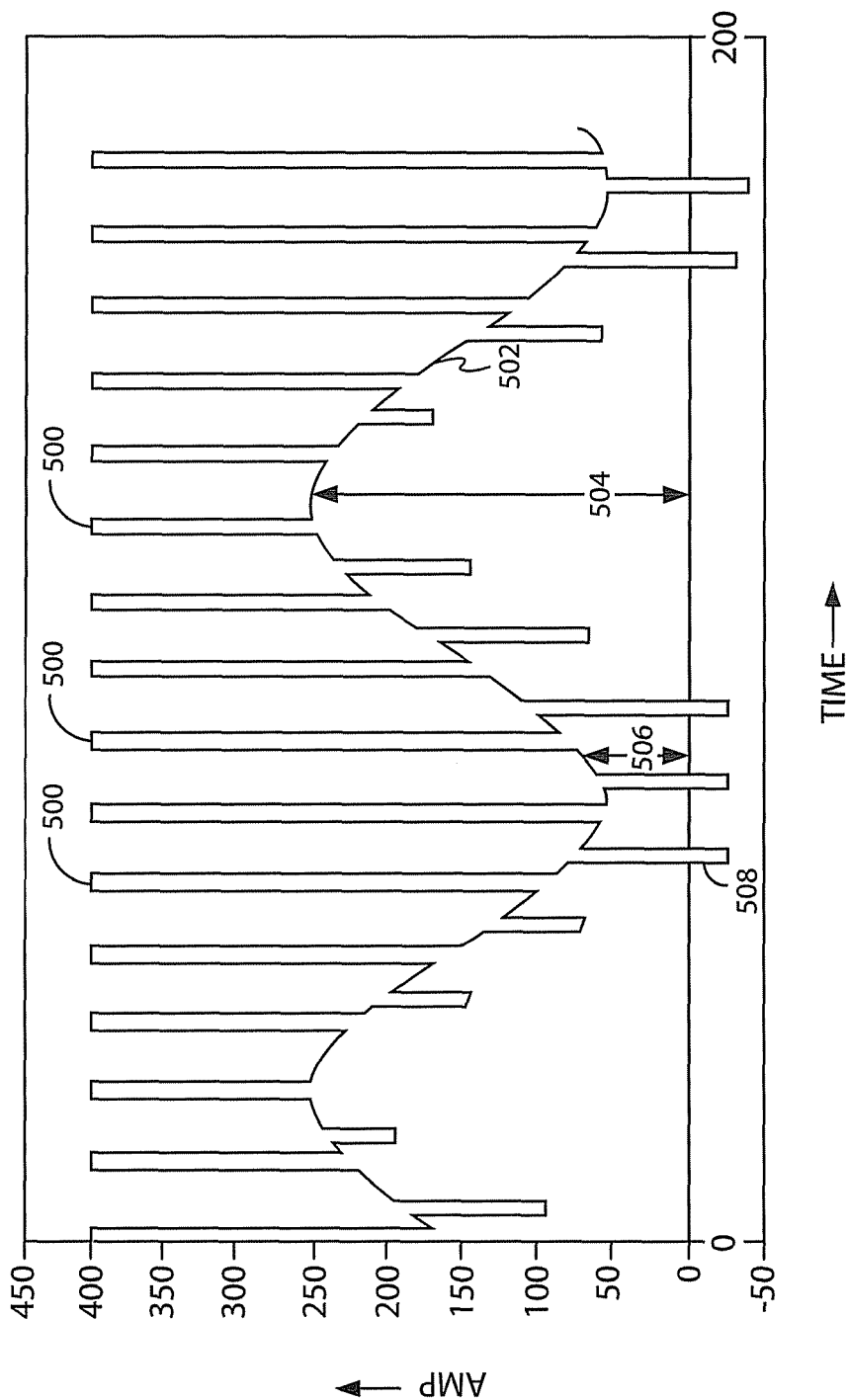
Figure 15:
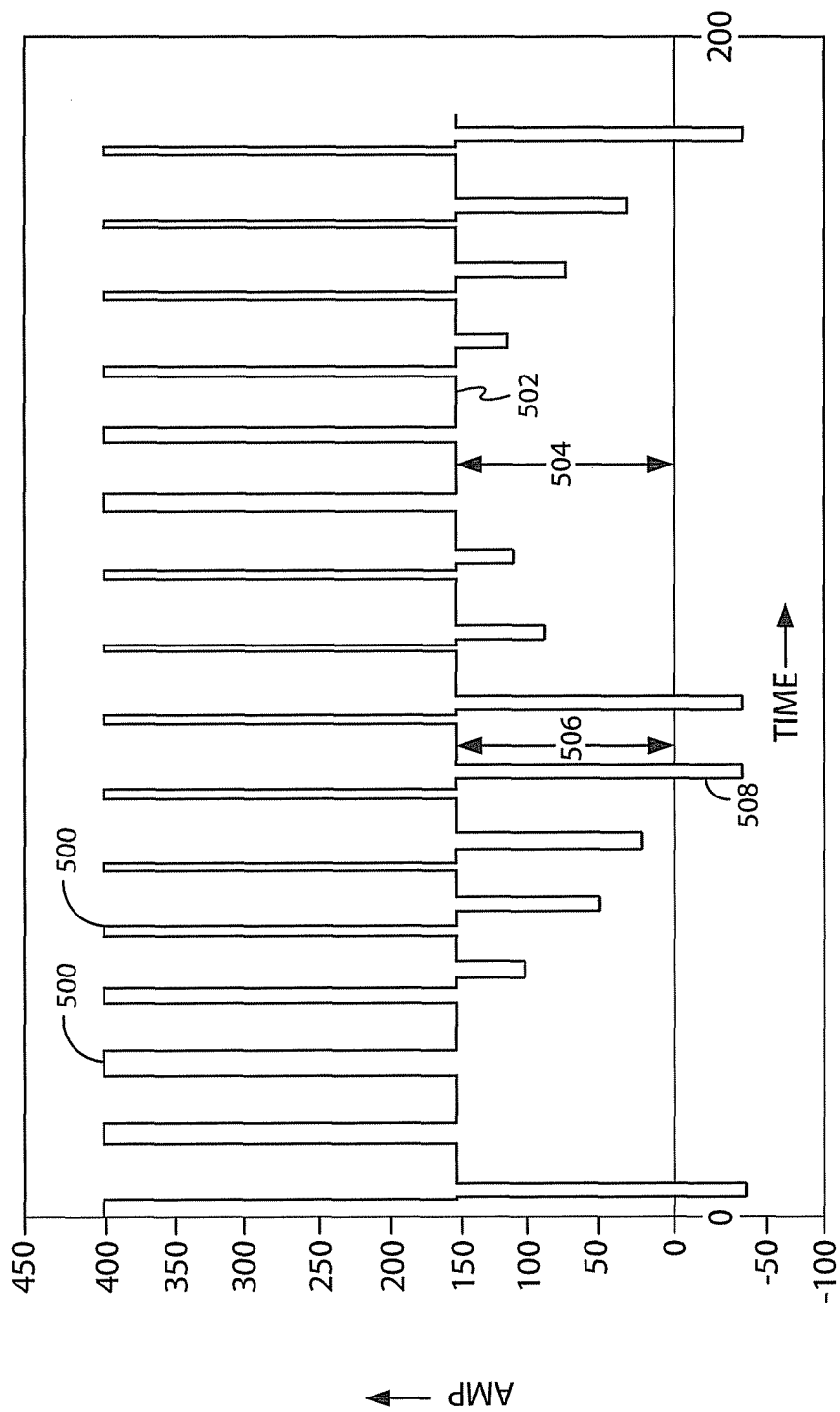
Figure 16:
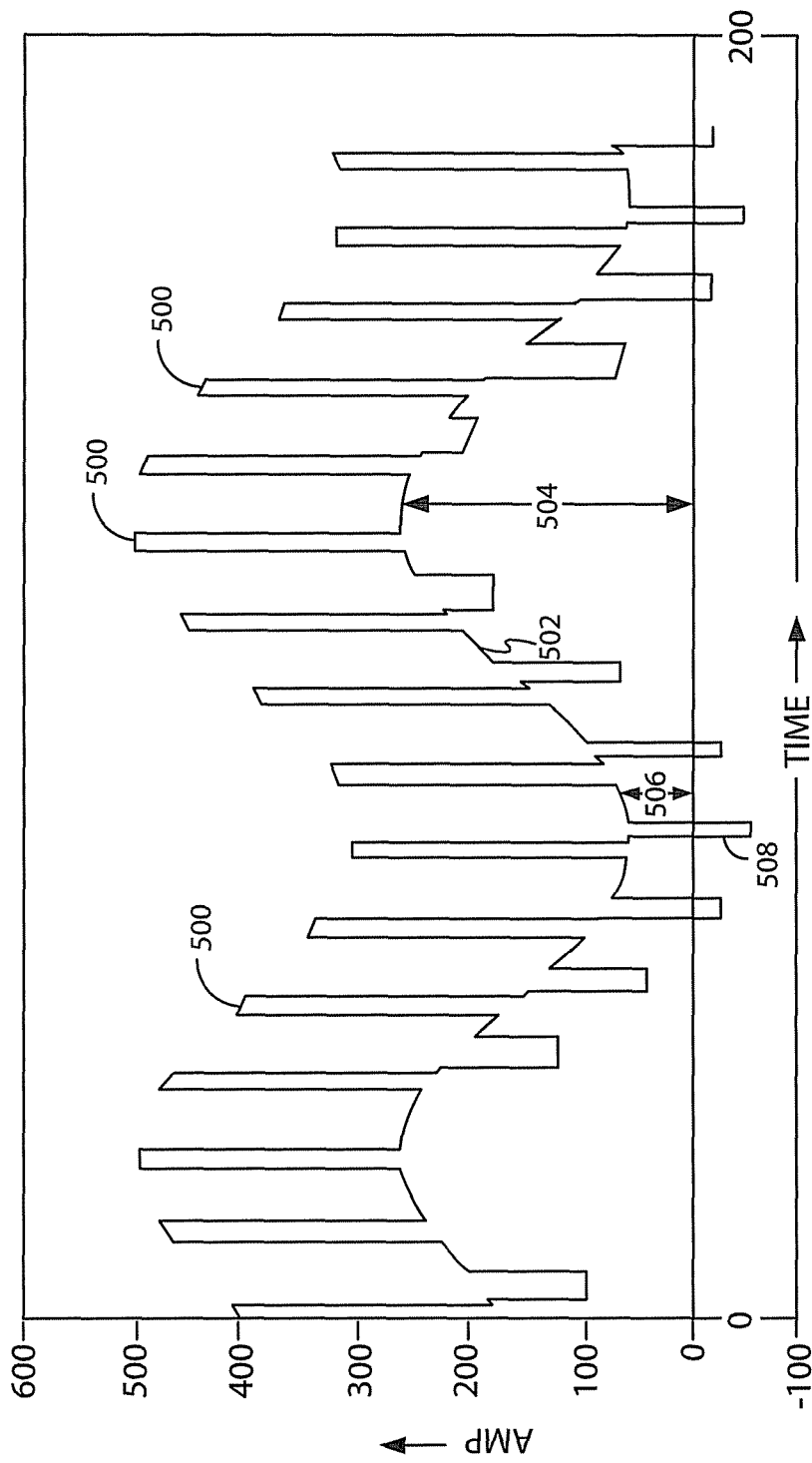

Referring now to FIG. 11, in another embodiment, the background current remains the same; therefore, the gain signal on input 444 is zero. In this particular graph, each pulse includes a negative polarity component and the peak time is changed in accordance with the sine wave function on line 100b. All inputs to the multiplier 430 of networks 410, 412, 414, 416, 418, 420, 422, and 424 are zero, except input 442. This produces an undulating modulated wave shape as shown in FIG. 11. Turning now to the embodiment of FIG. 12, the inputs to the initial multiplier 430 are zero, except for input 440, input 444, and input 454. Respectively, the peak current, the background current, and negative time are modulated. In this embodiment, each pulse includes a negative polarity component.

Generally, to adjust the modulation, the magnitude of the voltage or number on input lines 440, 442, 444, 446, 448, 450, 452 and/or 454 is changed. By using diagram 400 of FIG. 9, the pulse wave PW of FIG. 3 may be modulated to form high and low energy portions. Modulation allows other components and features of the pulses to be modulated. In FIG. 3 for example, the pulses have a fixed frequency. If the ramp up time of network 48 were modulated according to the signal on line 100e, the frequency would change. The time of the pulses would vary. To maintain constant frequency, for example, the modulation on input line 448 can be coordinated with the modulation on line 450. In an exemplary embodiment, one of these signals is positive and the other is negative. In this manner, the pulse period remains the same by increasing the ramp up time while decreasing the ramp down time. Various other techniques for modulating the pulses 110 can be implemented by modulation diagram 400.

Details of exemplary modulation schemes are not intended to be limiting to the concept of a high frequency pulse wave modulated by a low frequency shift back and forth or undulation by a selected curve. Modulation diagram 400 is capable of generating a variety of pulse waves with any combination of exemplary pulse features of registers 436. For example, other exemplary pulse waves are shown in FIGS. 13-16, which demonstrate a variety of non-exhaustive pulse waves that may be generated by various modulation schemes. The pulse waves shown in FIGS. 10-16 include pulses 500, background current 502, high energy portion 504, low energy portion 506, and negative polarity components 508.

As shown in the embodiments of FIGS. 10-16, the average current can remain the same during modulation as it was without any modulation. In these embodiments, the modulation merely adds to and subtracts from the current in a single cycle to thereby maintain the average current. Also, the high frequency of the pulse, when a fixed frequency (i.e. the pulse periods are not modulated) is an integer multiple of the low frequency used for modulation.

Figure 17:
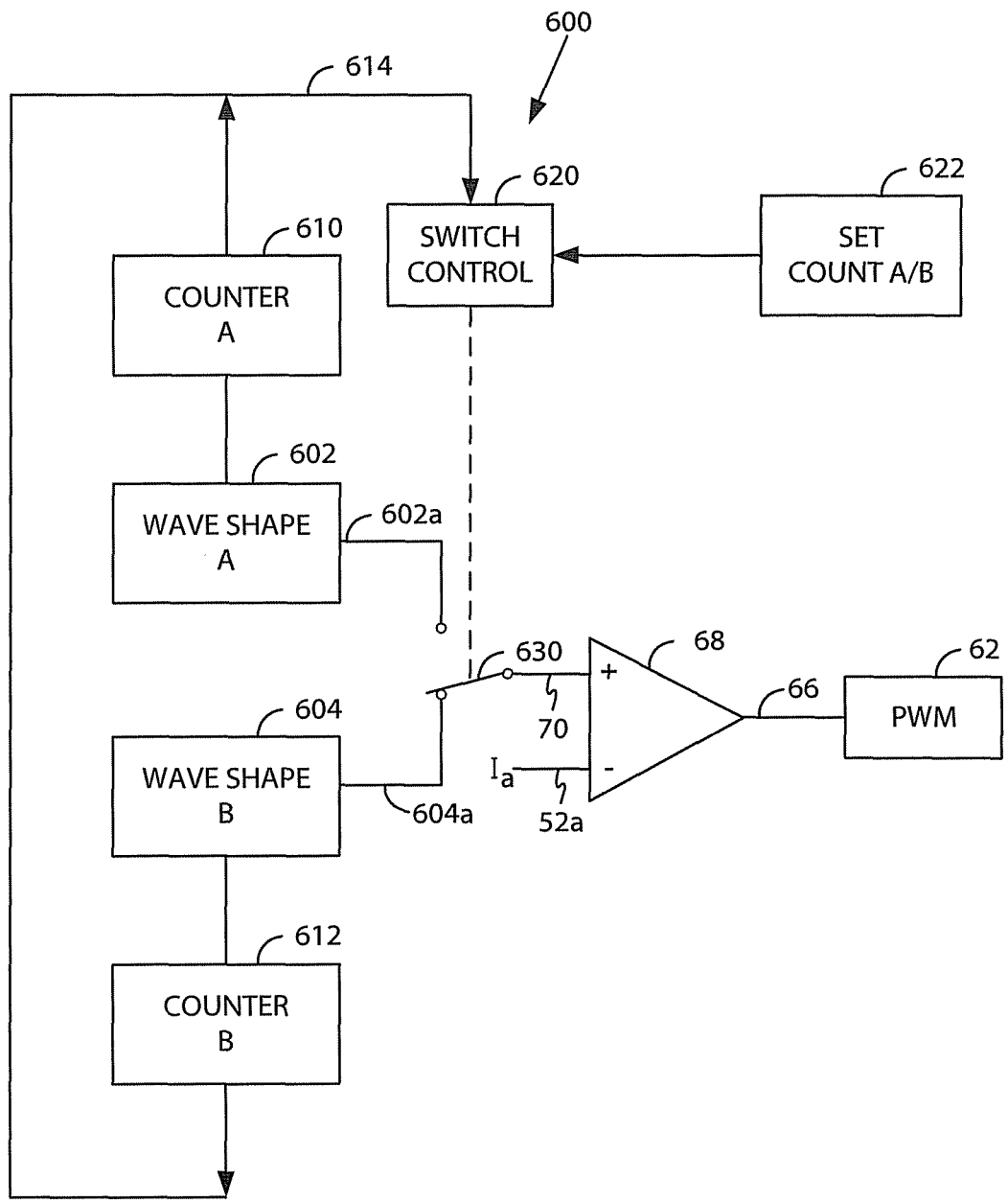
FIG. 17 is a block diagram illustrating an exemplary implementation of a welding system and method contemplated by the present invention for shifting between two wave forms.

A further embodiment of the concepts of this invention are illustrated in FIG. 17, where system 600 controls the current command signal on line 70 for controlling the output shape of the weld process through error amplifier 68, as explained with respect to FIG. 1. System 600 has two wave shape forming digital processing sections 602, 604 corresponding generally to shape selectors or software 82a, 84a used with wave shaper 80 of FIG. 1. Wave shape A is processed when the output 602a of wave shaper section 602 is directed to command input line 70. In a like manner, the wave shape B is used to control the welding process when output line 604a of wave shaper section 604 is connected to the command signal line 70. As in FIG. 4, the pulses in wave shaper section 602 are counted by counter 610 and the pulses outputted from wave shaper section 604 are counted by counter 612. The counts are communicated by line 614 with switch control 620 having counts A and B set by input device 622. Switch control 620 shifts the electronic switch 630 between output lines 602a, 604a in accordance with the count numbers A and B set by device 622. These count numbers may correspond generally to counts N1, N2 of FIG. 4. System 600, in some instances, may be modified to count the total weld cycles of wave shape A or wave shape B, instead of the individual pulses as done by the control logic 90 in FIG. 4. Consequently, switch control 620 shifts from one process to the other process in accordance with the pre-selected count numbers input from device 622. In this manner, for example, system 600 can processes a high energy process when line 602a is the weld control line and a low energy process when the control line is line 604a. This is merely another version of shifting between high and low energy in a total welding process in accordance with the pre-selected modulation. In this embodiment, the modulation is by the count numbers of either of the pulse cycles from each of the wave shapes A and B.

While the present invention has been illustrated by the description of embodiments thereof, and while the embodiments have been described in some detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and methods, and illustrative examples shown and described. Accordingly, departures may be made from such details without departing from the spirit or scope of the applicant's general inventive concept.

The following is claimed:

1. An electric arc welder comprising:
    a high speed switching power supply with a controller for creating current pulses at a high frequency through a gap between a workpiece and a welding wire advancing toward the workpiece, wherein each of the high frequency current pulses includes a positive polarity peak current to transfer a droplet of molten metal from the welding wire to the workpiece through the gap;
    a wave shape generator defining a shape of the high frequency current pulses and a polarity of the high frequency current pulses during a weld cycle, wherein the weld cycle includes current pulses at the high frequency during a low energy portion and a high energy portion; and
    wherein at least one of the high frequency current pulses only during the low energy portion of the weld cycle includes negative polarity current to generate less heat in the workpiece than the high frequency current pulses during the high energy portion of the weld cycle.

2. The electric arc welder of claim 1, wherein the wave shape generator is responsive to a signal indicative of the heat generated in the workpiece and defines the high frequency pulses during the low energy portion of the weld cycle with additional negative polarity current when the heat generated in the workpiece increases.

3. The electric arc welder of claim 2, wherein the high energy portion and the low energy portion alternate at a low frequency, wherein the high frequency of the pulses is substantially greater than the low frequency of the alternating portions.

4. The electric arc welder of claim 3, wherein the low frequency of the alternating portions is in the range of ¼ Hz to 40 Hz.

5. The electric arc welder of claim 1, wherein the high frequency of the high frequency current pulses is in the range of 50-400 Hz.

6. The electric arc welder of claim 1, further comprising a variable polarity switch responsive to the wave shape generator to control the polarity of the high frequency current pulses.

7. The electric arc welder of claim 2, wherein the signal indicative of the heat in the workpiece is associated with an arc length between the workpiece and the welding wire, and wherein the wave shape generator defines the high frequency pulses during the low energy portion of the weld cycle with additional negative polarity current when the arc length decreases.

8. The electric arc welder of claim 2, wherein the additional negative polarity current includes at least one of increasing an amperage of the negative polarity current and increasing a time duration of the negative polarity current.

9. The electric arc welder of claim 1, further comprising a modulator to change the shape of the high frequency current pulses in a repeating pattern, wherein the repeating pattern occurs at a low frequency.

10. The electric arc welder of claim 9, wherein the repeating pattern is selected from the group consisting of a sine curve, an alternating generally square curve, a saw tooth curve, and an alternating curvilinear curve, and wherein the repeating pattern defines a weld cycle with the high frequency pulses, and wherein the weld cycle comprises a high energy portion and a low energy portion alternating at the low frequency.

11. The electric arc welder of claim 10, further comprising a wire feeder to feed the welding wire advancing toward the workpiece, wherein the wire feeder is responsive to the wave shape generator to control a wire feed speed, and wherein the wire feed speed is a first value during the high energy portion and a second value during the low energy portion.

12. A method of electric arc welding using an electric arc welder, comprising:
creating current pulses at a high frequency through a gap between a workpiece and a welding wire advancing toward the workpiece;
defining a shape of the high frequency current pulses and a polarity of the high frequency current pulses during a weld cycle, wherein the weld cycle includes current pulses at the high frequency during a low energy portion with variable polarity and a high energy portion with positive polarity; and
wherein at least one of the high frequency current pulses only during the low energy portion of the weld cycle includes a negative polarity current to generate less heat in the workpiece than the high frequency current pulses during the high energy portion of the weld cycle.

13. The method of claim 12, wherein defining the shape and polarity of the high frequency current pulses includes responding to a signal indicative of the heat generated in the workpiece and defining the high frequency pulses during the low energy portion of the weld cycle with additional negative polarity current when the heat generated in the workpiece increases.

14. The method of claim 13, wherein the high energy portion and the low energy portion alternate at a low frequency, wherein the high frequency of the pulses is substantially greater than the low frequency of the alternating portions.

15. The method of claim 14, wherein the low frequency of the alternating portions is in the range of ¼ Hz to 40 Hz.

16. The method of claim 12, wherein the high frequency of the high frequency current pulses is in the range of 50-400 Hz.

17. The method of claim 13, wherein the signal indicative of the heat in the workpiece is associated with an arc length between the workpiece and the welding wire, and defining the high frequency pulses during the low energy portion of the weld cycle with additional negative polarity current when the arc length decreases.

18. The method of claim 13, wherein defining the high frequency pulses during the low energy portion of the weld cycle with additional negative polarity current includes at least one of increasing an amperage of the negative polarity current and increasing a time duration of the negative polarity current.

19. The method of claim 12, further comprising modulating the shape of the high frequency current pulses in a repeating pattern, wherein the repeating pattern occurs at a low frequency.

20. The method of claim 19, wherein the repeating pattern is selected from the group consisting of a sine curve, an alternating generally square curve, a saw tooth curve, and an alternating curvilinear curve, and wherein the repeating pattern defines a weld cycle with the high frequency pulses, wherein the weld cycle comprises a high energy portion and a low energy portion alternating at the low frequency.

21. The method of claim 20, further comprising feeding the welding wire advancing toward the workpiece at a wire feed speed, and wherein the wire feed speed is a first value during the high energy portion and a second value during the low energy portion.

22. An electric arc welder comprising:
a means for creating current pulses at a high frequency through a gap between a workpiece and a welding wire advancing toward the workpiece, wherein each of the high frequency current pulses includes a positive polarity peak current to transfer a droplet of molten metal from the welding wire to the workpiece through the gap;
a means for shaping the high frequency current pulses during a weld cycle, wherein the weld cycle includes current pulses at the high frequency during a low energy portion and a high energy portion;
a means for changing a polarity of the high frequency current pulses; and
wherein at least one of the high frequency current pulses only during the low energy portion of the weld cycle includes negative polarity current to generate less heat in the workpiece than the high frequency current pulses during the high energy portion of the weld cycle.

* * * * *